United States Patent [19]

Copper

[11] Patent Number: 5,640,152
[45] Date of Patent: Jun. 17, 1997

[54] HAND HELD COMPUTER INPUT APPARATUS AND METHOD

[76] Inventor: John M. Copper, 3105 Perrysville Ave., Pittsburgh, Pa. 15214

[21] Appl. No.: 585,923

[22] Filed: Jan. 16, 1996

Related U.S. Application Data

[62] Division of Ser. No. 238,355, May 5, 1994, Pat. No. 5,485,171, which is a division of Ser. No. 864,466, Apr. 6, 1992, abandoned, which is a continuation-in-part of Ser. No. 771,601, Oct. 4, 1991, abandoned.

[51] Int. Cl.$^6$ .................................................. H04Q 1/00
[52] U.S. Cl. ................................ 340/825.54; 340/825.69
[58] Field of Search ........................... 340/825.31, 825.34, 340/825.69, 825.72, 825.54

[56] References Cited

U.S. PATENT DOCUMENTS

| | | | |
|---|---|---|---|
| 4,750,118 | 6/1988 | Heitschel | 340/825.69 |
| 4,766,746 | 8/1988 | Henderson | 340/825.31 |
| 4,973,958 | 11/1990 | Hirano | 340/825.72 |
| 5,153,919 | 10/1992 | Reeds, III | 380/44 |
| 5,204,768 | 4/1993 | Tsakiris | 340/825.72 |
| 5,252,960 | 10/1993 | Duhame | 340/825.31 |
| 5,317,695 | 5/1994 | Celi, Jr. | 395/275 |
| 5,404,524 | 4/1995 | Celi, Jr. | 395/700 |
| 5,485,171 | 1/1996 | Copper et al. | 345/160 |

*Primary Examiner*—Brian Zimmerman
*Attorney, Agent, or Firm*—Gaca Matis & Baum

[57] ABSTRACT

A method and system for generating command signals for a computer monitor or other equipment. The system includes at least one pressure responsive potentiometer and a device operatively connected with such potentiometer for generating a command signal indicating at least one of the direction, intensity and duration of pressure applied to such potentiometer. The method remotely controls a function of a computer monitor or other equipment in response to signals obtained from pressure sensitive potentiometers manipulated by a user. The method includes the steps of periodically iterating to detect signals present on such pressure sensitive potentiometers, comparing the signals detected on each iteration to determine at least one of the amount and direction of change, generating a control signal reflecting the information determined in the comparison step, then transmitting the control signal to the computer or other equipment in a form acceptable by such computer or other equipment to effect a change in the function being controlled. The control system includes a hand held device having a control disc readily manipulable by a digit of a hand holding the device. There is also disclosed a form of the hand held device in which position control signals as well as "clicking" and "dragging" operation signals can all be controlled with a single digit of the hand of a user.

7 Claims, 35 Drawing Sheets

Microfiche Appendix Included
(2 Microfiche, 83 Pages)

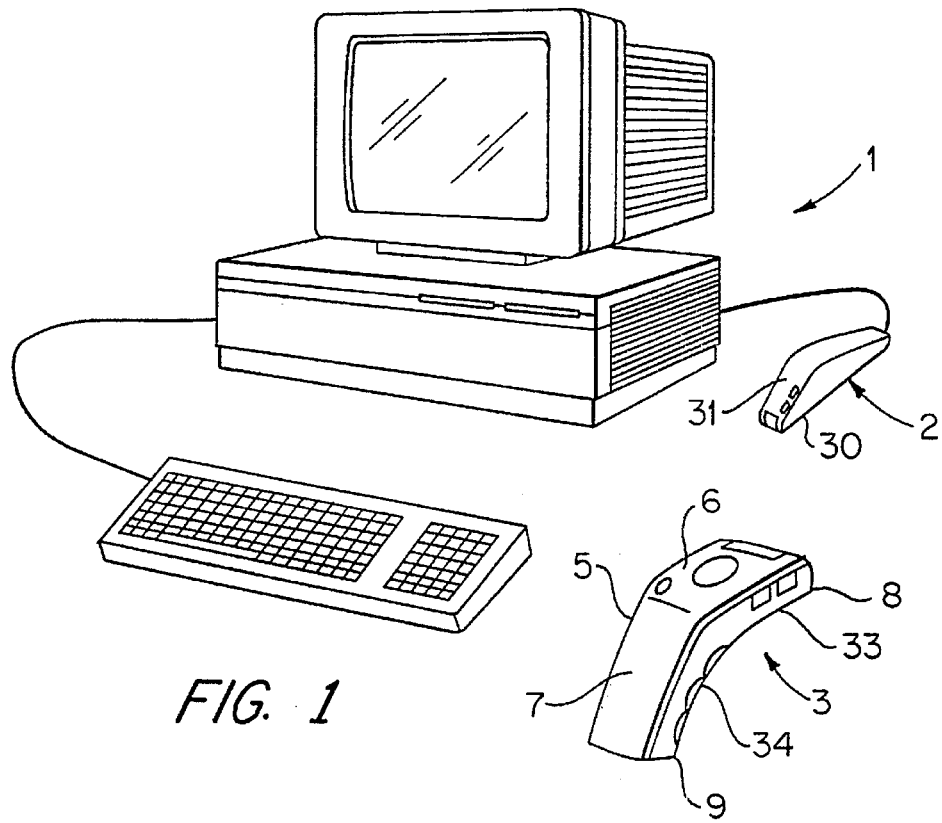
FIG. 1
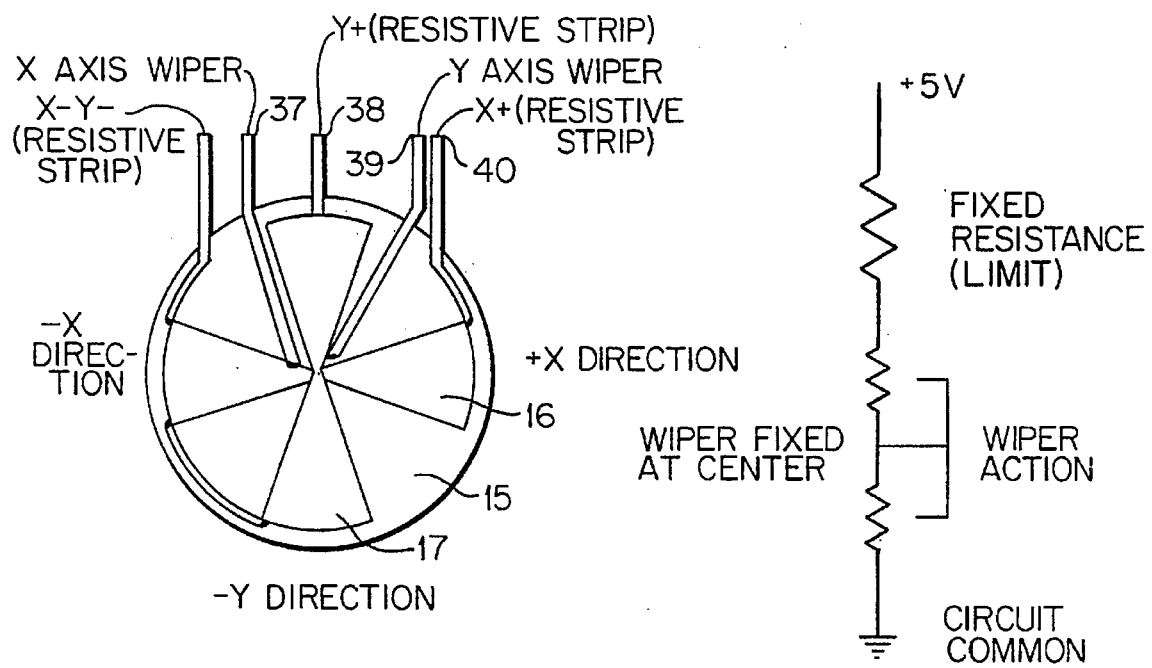
FIG. 3
FIG. 4

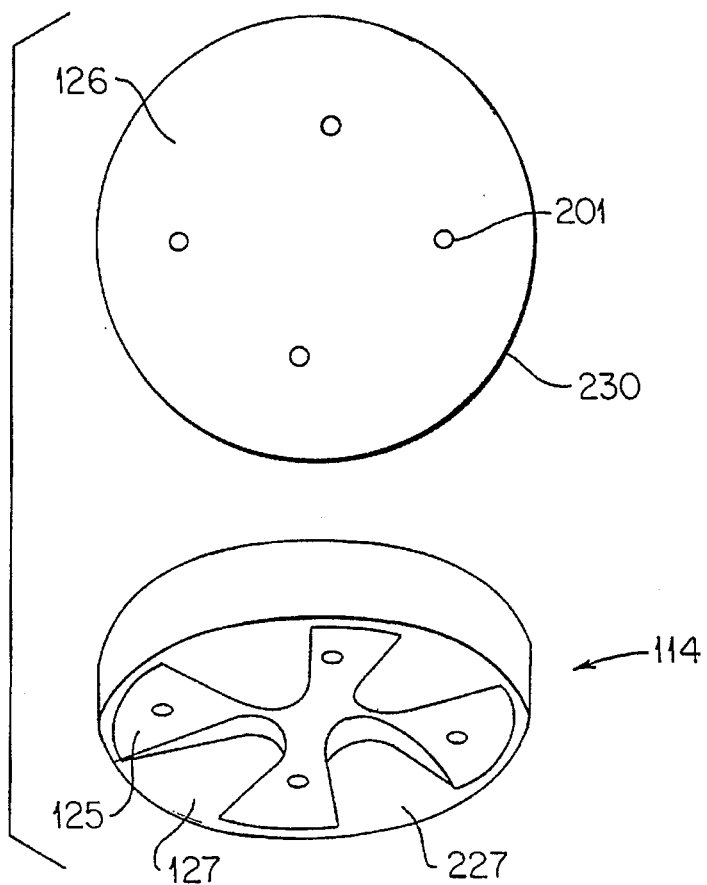
FIG. 27
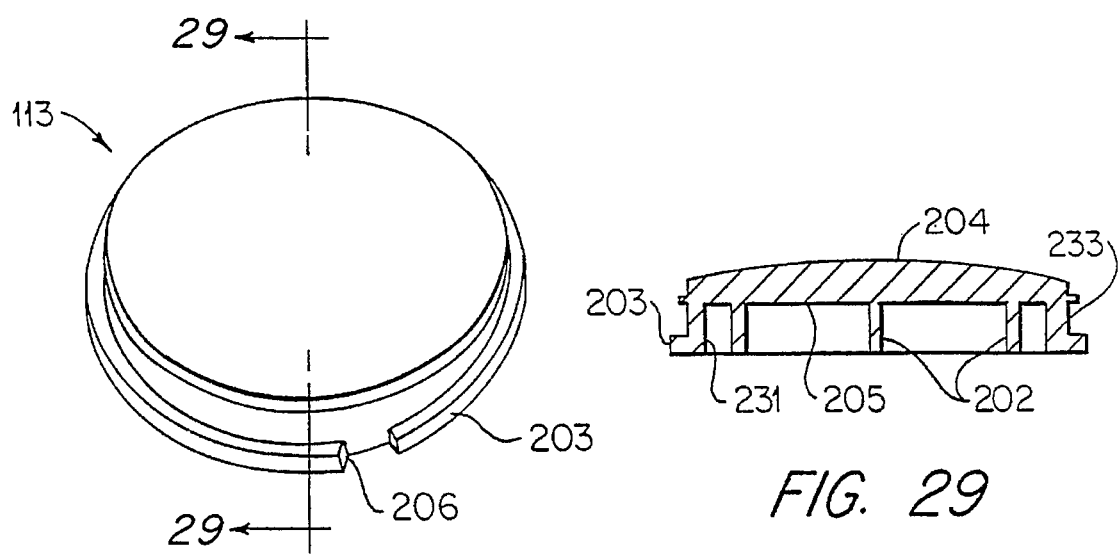
FIG. 28
FIG. 29

HAND HELD COMPUTER INPUT APPARATUS AND METHOD

This application is a division of application Ser. No. 08/238,355, filed May 5, 1994 now U.S. Pat. No. 5,485,171, which was a division of application Ser. No. 07/864,466, filed Apr. 6, 1992, now abandoned, which was a continuation-in-part of application Ser. No. 07/771,601, filed Oct. 4, 1991, now abandoned.

BACKGROUND OF INVENTION

1. Field Of Invention

This invention relates generally to the interaction with and control of computers or other electronic equipment. For example, the invention can be used in conjunction with electronic light and sound equipment, personal computers or video recording and playback equipment. In particular, the present invention relates to a means of generating command and/or cursor position control through the use of a remote manipulandum. When in operation, the apparatus does not require a dedicated surface or placement in a fixed position, thereby providing an arrangement which is portable and convenient.

2. Prior Art

A typical computer based graphic display unit basically comprises a display screen, a display controller, a data channel and an input device. Computer input devices exist in various forms. For instance, with a standard typewriter-like keyboard, commands are entered by pressing discrete character keys. The commands are then interpreted utilizing corresponding application software. Similarly, a keyboard may be designed to incorporate the use of special function keys which when interpreted through appropriate software, initiate specific actions or cause the computer display cursor to move. Light pens and touch screens permit somewhat more flexible human-computer interactions; however, these devices require the user's hand to be close to the computer display.

The most recent innovations in the field of position cursor devices, includes the use of joysticks, trackball devices, ball-type cursor control assemblies and mouses. A mouse device provides cursor positioning, and some control capabilities through buttons or momentary action switches. Simply described, a mouse consists of a ball and case. In use, the casing is held by the operator to place the ball against a given dedicated surface. Movement of the case will cause the ball to roll on the surface in any desired two-dimensional direction. The main drawback to the mouse device is that it requires a dedicated, relatively flat and unobstructed area to provide control and cursor position information. Other types of mouses, such as those requiring optical reflective surfaces, require special surface materials.

The ball-type cursor control assembly will typically include a relatively freely rotatable control ball supported for rolling movement in frictional engagement with two or more traction devices in the form of wheels, shafts and the like to rotate said traction devices about a horizontal axis in response to the rolling movement of the control ball. These traction devices are in turn coupled to appropriate signal generating components which provide electrical output signals for controlling the position of the cursor within the field of the video display, typically in terms of Cartesian coordinates.

Joysticks and trackballs provide control and cursor position information without the need for a large dedicated surface area. A joystick is primarily a lever supported by a gimbal mechanism and is tiltable by the operator in any direction of a plane. The direction and angle of the inclination are detected to generate voltages or digital signals representative of the components in the X- and Y-axis directions, respectively. Most joysticks are designed to be placed on a surface, such as a tabletop. The joystick device is also limited by the pivoting range of the lever.

In its most basic form a trackball device includes a housing containing a plurality of rotatable supports and a ball seated within the supports. A portion of the ball projects through an opening in the housing to allow for manual rotation by an operator. Trackballs have drawbacks both in design and in operation. The axes of rotation of the rotatable supports of the invention are fixed and proper operation of the device requires manufacture of the parts to very exacting tolerances. Also, trackballs have tended to be unduly noisy and have exhibited poor shock and impact resistance. Finally, while neither joysticks nor trackballs require large dedicated surfaces, many graphically oriented software packages require "dragging" actions which entail simultaneously holding down a button and moving the cursor. Such dragging operations are awkward to perform using trackballs and joysticks.

Accordingly, the primary object of the present invention is to provide a computer input apparatus which the user may move about in virtually any dimension while exercising control over the host computer. This flexibility is achieved by means of a physical design which facilitates both hand-held and stationary desktop operations; and by providing electronic support for a plurality of communication modes and control functionality. This invention will also allow the user to perform functions, such as the control of the movement of a cursor on a video display, without the use of a large dedicated surface. Finally, the invention has incorporated many ergonomically advantageous human-computer interactions, such as the provision of a device which can be manipulated by a human user's natural pointing finger to select and control functions of a computer or other apparatus without having to be close to the apparatus being controlled.

SUMMARY OF THE INVENTION

In a first aspect, the present invention provides a system fort he generation of command signals for at least one of a computer and other equipment. This system includes at least one pressure responsive potentiometer. Operatively connected with such potentiometer is a means for generating a command signal indicating at least one of the direction, intensity and duration of pressure applied to such potentiometer.

According to a second aspect of this invention, there is provided a system for generating command signals for either a computer or other selected equipment. In this system both a transmitter and a receiver are provided. Further, there is a means for operatively communicating command signals from the receiver to such computer monitor or other preselected equipment. The system also includes means for operatively communicating command signals from the transmitter to the receiver and means in the transmitter for generating a command signal which reflects at least one of the direction, intensity and duration of pressure applied to at least one potentiometer means disposed in such transmitter.

A third aspect of the instant invention provides a method for remotely controlling a preselected function of one of a computer and other preselected equipment. Such control being in response to signals generated by pressure sensitive potentiometers which can be manipulated by a user. This method includes the steps of periodically iterating to detect the signals present on such pressure sensitive potentiometer. Thereafter, comparing the signals detected on each iteration with the corresponding signals detected on the last previous iteration to determine at least one of the amount and direction of change. Then generating a control signal which reflects the information determined in the comparison step. Finally, a control signal is transmitted to such computer or other equipment in a form acceptable to such computer or other equipment to effect a change in the function being controlled.

In a more limited aspect, the present invention provides a method for remotely controlling the positioning of a cursor on a computer monitor or other selected equipment. Such positioning is in response to signals obtained from pressure sensitive potentiometer means manipulated by a user. This method includes the steps of periodically iterating to detect the signals generated by such pressure sensitive potentiometer means; thereafter comparing the signals detected on each iteration with the corresponding signal detected on the last previous iteration to determine at least one of the amount and direction of change; then generating a control signal reflecting the information determined in the comparison step and finally transmitting the control signal to such computer monitor or other equipment in a form acceptable by the computer monitor or other equipment to effect a change in position of the cursor.

According to a final aspect, the instant invention provides a hand held device for producing an output reactive to manipulation of a part of such device by the digits of a hand holding the device. Such device includes a case having a generally rectangular head portion and a generally rectangular handle portion rigidly attached to each other and defining an obtuse angle between them. The angle between the head portion and the handle portion is such that the device can be grasped while resting on a flat surface. There is a recess or opening provided in the top surface in such head portion readily accessible to the forefinger of a hand grasping the handle portion. Such part of the device which is manipulated by the digits of a hand includes a control disc located in such recess or opening and is movable therein in a generally rocking motion. Such control disc being movable by manipulation of the forefinger of a hand grasping the handle.

OBJECT OF THE INVENTION

It is, therefore, one of the primary objects of the present invention to provide a system to improve control of at least one of a computer, monitor and other selected equipment.

Another object of the present invention is to provide a system for generating command signals for one of a computer monitor or other equipment which signals reflect at least one of the direction, intensity, and duration of pressure being applied to a potentiometer.

Still another object of the present invention is to provide a system for generating command signals for one of a computer monitor and other equipment which system includes two pressure responsive potentiometers that are inter-connected in a manner to represent X and Y axis of a Cartesian coordinate system.

Yet another object of the present invention is to provide a system for generating command signals for a computer monitor which provides improved control of a cursor.

A further object of the present invention is to provide a system for generating command signals for one of a computer monitor or other equipment in which a transmitter for the command signals can be hand held thereby enabling the user of the system more freedom of movement.

Another object of the invention is to provide a system for generating command signals for a computer which system includes a portable transmitter which can be held in the hand of a user and operated and which can also be grasped and operated while it is resting on a flat surface.

It is also an object of the invention to provide a system in which signals for moving a cursor on a display screen and for performing "clicking" and "dragging" operations can all be initiated by a single digit of the hand of an operator.

An additional object of the present invention is to provide a system for generating command signals for one of a computer monitor or other equipment which provides faster response times.

Still yet another object of the present invention is to provide a system for generating command signals for one of a computer monitor or other equipment in which the receiver portion of such system serves as a cradle for the transmitter portion of such system when the system is not in use.

It is another object of the present invention to provide a method for remotely controlling a preselected function of one of a computer monitor and other equipment which provides faster response time in performing such function.

Another object of the present invention is to provide a method of and a system for generating command signals for one of a computer monitor and other equipment which utilizes a microcontroller and dedicated software.

In addition to the various objects and advantages of the present invention which has been described in detail above, it should be obvious that other objects and advantages of the present invention will become apparent to these persons who are skilled in the control art from the following more detailed description of the invention, particularly, when such description is taken in conjunction with the attached drawing figures.

BRIEF DESCRIPTION OF THE DRAWINGS

FIG. 1 is a pictorial representation of the invention in association with a computer.

FIG. 3 shows the transducer of the invention.

FIG. 4 illustrates the electrical equivalent of the transducer.

FIG. 27 illustrates the physical construction of the form of resilient pad used with the form of position control illustrated in FIG. 21.

FIG. 28 is a perspective view of the control disc used in the position control of FIG. 21.

FIG. 29 is a cross-sectional view taken along the line A—A in FIG. 28.

DESCRIPTION OF THE PREFERRED EMBODIMENTS

Figure 2:
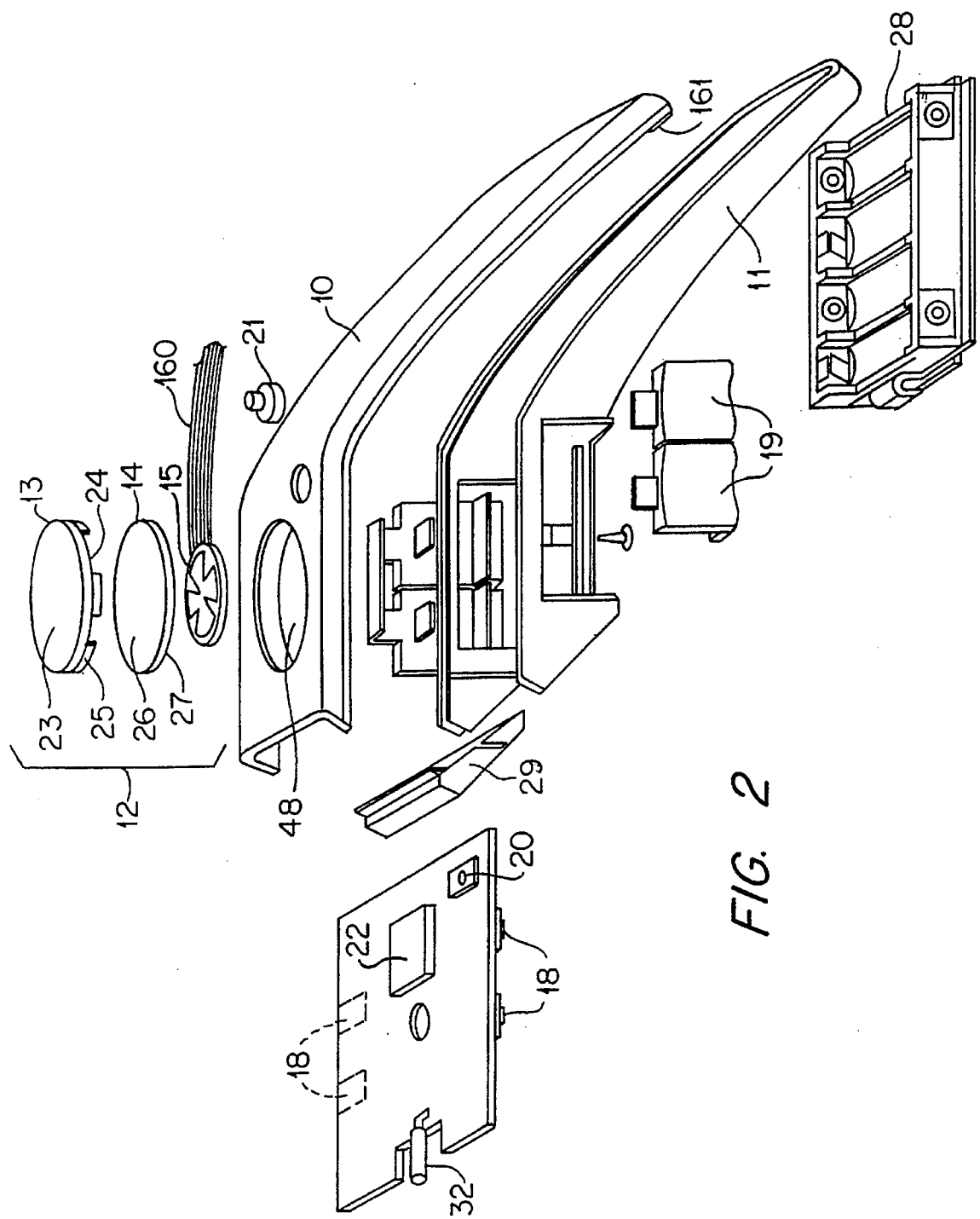
FIG. 2 shows one form of the physical construction of the transmitter of the invention.

Referring now to FIG. 1 of the drawings, a computer 1 is shown connected to a receiver 2 which in turn is associated with a transmitter 3. The receiver is shown connected to the computer by means of a cable 4 but it can be housed in the same housing as the computer. As can readily be seen, the transmitter comprises a case 5 which includes a head portion 6 and a handle portion 7 disposed at an angle to the head so that the operating portions of the head can be easily reached and manipulated by the fingers of a person holding the transmitter in his hand. Further the ends 8 and 9 of the head and handle respectively of the transmitter can be used to rest the transmitter in a stable manner on a suitable surface. As seen in FIG. 2, the transmitter case may be made in two pieces, an upper part 10 and a bottom part 11 suitably joined together to retain the various operating parts hereinafter described. Included in the transmitter case is a cursor position control 12, comprising a thick film position transducer 15 located and electrically connected to represent the X and Y axes of a Cartesian coordinate system. Associated with the position transducer are molded disc 13 and a resilient pad 14 permanently secured to said disc 13. Alternatively resilient pad 14 may be placed between disc 13 and transducer 15 but not secured to disc 13. When pressure is applied to disc 13 in a given orientation a corresponding change in the voltage on the legs of the transducer occur which can be converted to position information on the screen of the computer. By virtue of the shape and resilience of pad 14, when pressure is released from the disc 13, the disc 13 will be returned to its neutral position in which no signal is generated by the position transducer. As seen in FIG. 3, the position transducer comprises an X axis resistance strip 16 and a Y axis resistance strip 17 which when assembled form a cruciform pattern resembling a formee cross or rosette and electrically provide a potentiometer circuit equivalent electrically to the circuit shown in FIG. 4. It is obvious that the resistances may be shaped and assembled to resemble other patterns and shapes.

Figure 9:
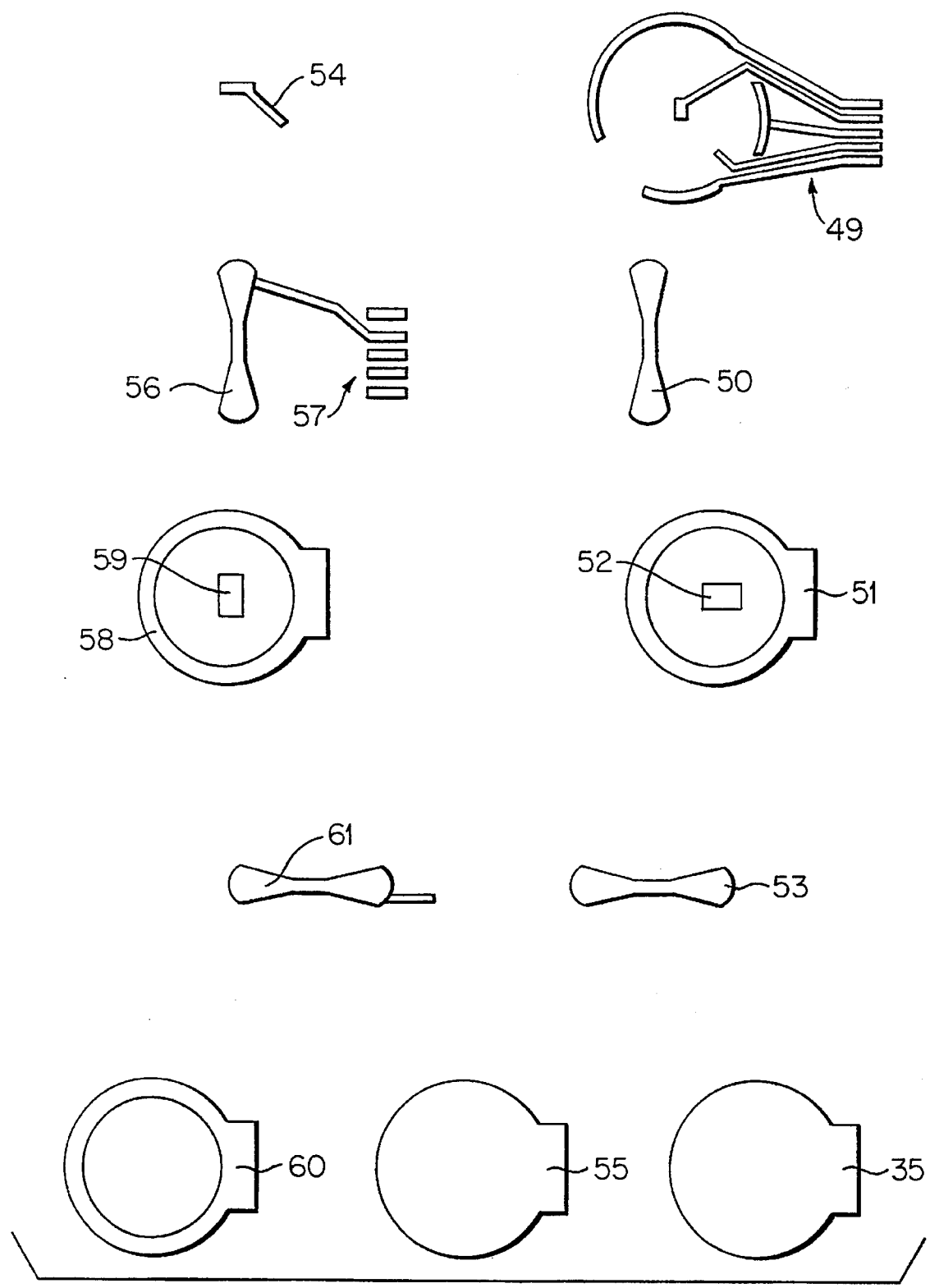
FIG. 9 shows the unassembled parts of the transducer shown in FIG. 3.
Figure 10:
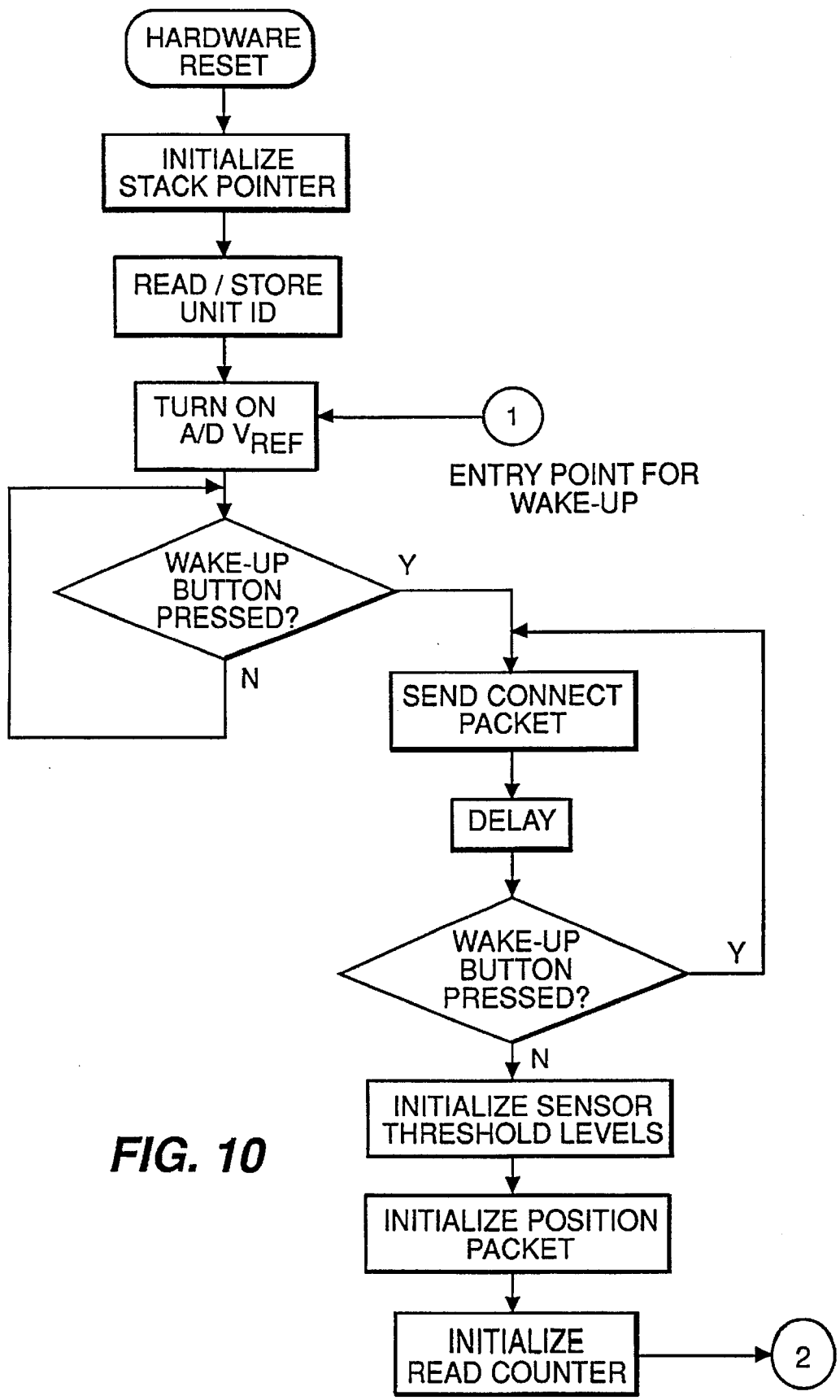
FIGS. 10–14 make up a flow chart of the logic of the software controlling the transmitter showing in FIGS. 5 and 6.
Figure 11:
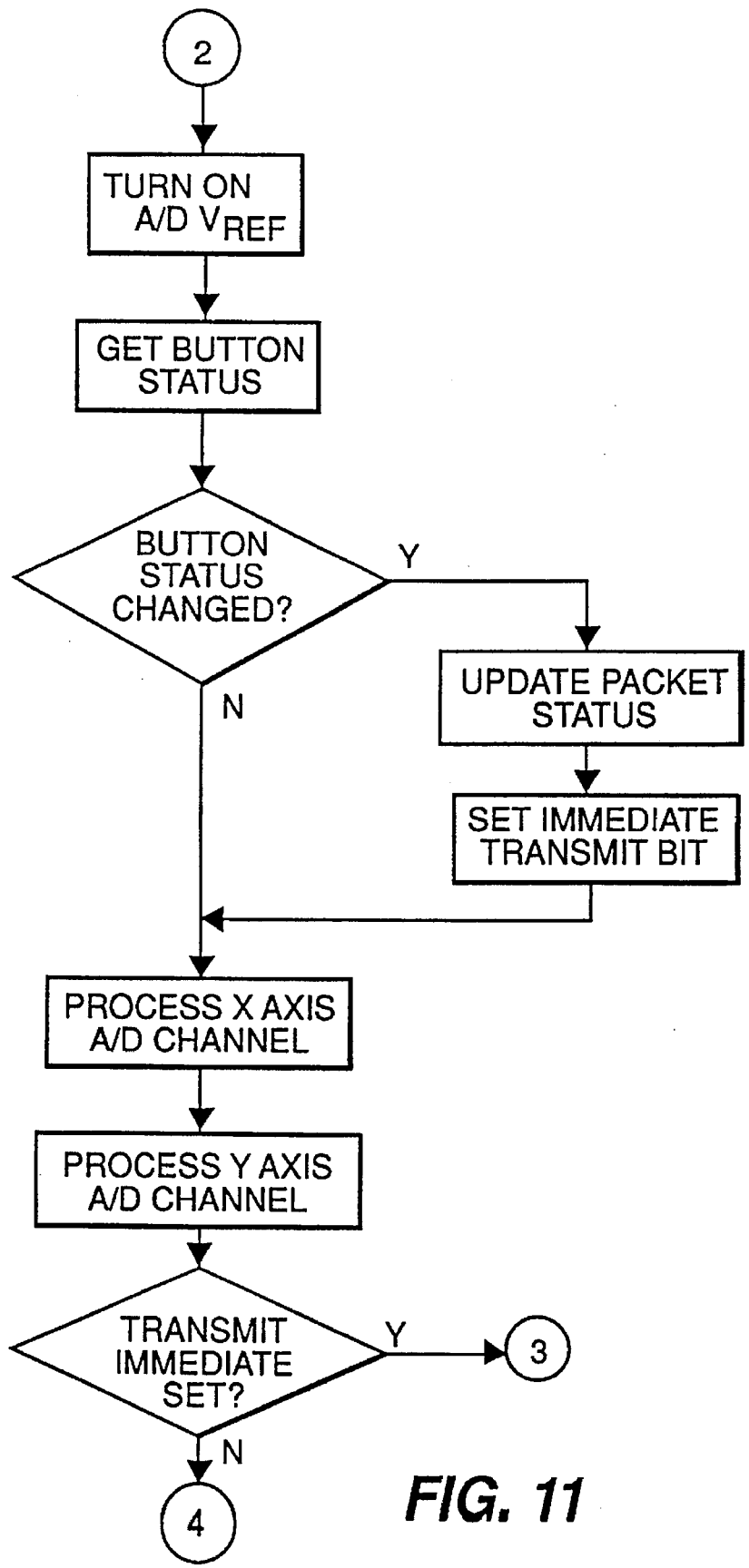
Figure 12:
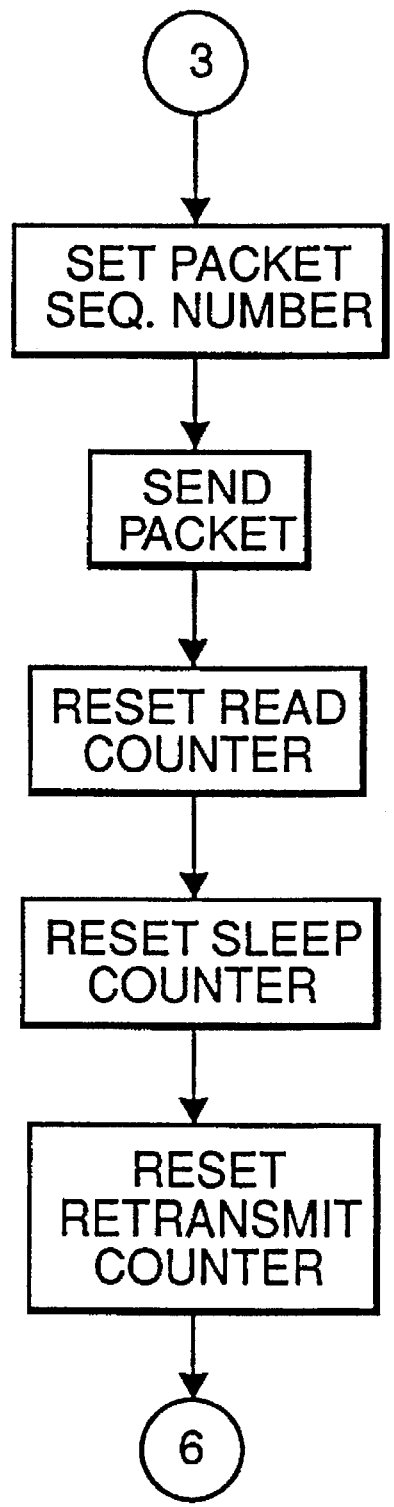
Figure 13:
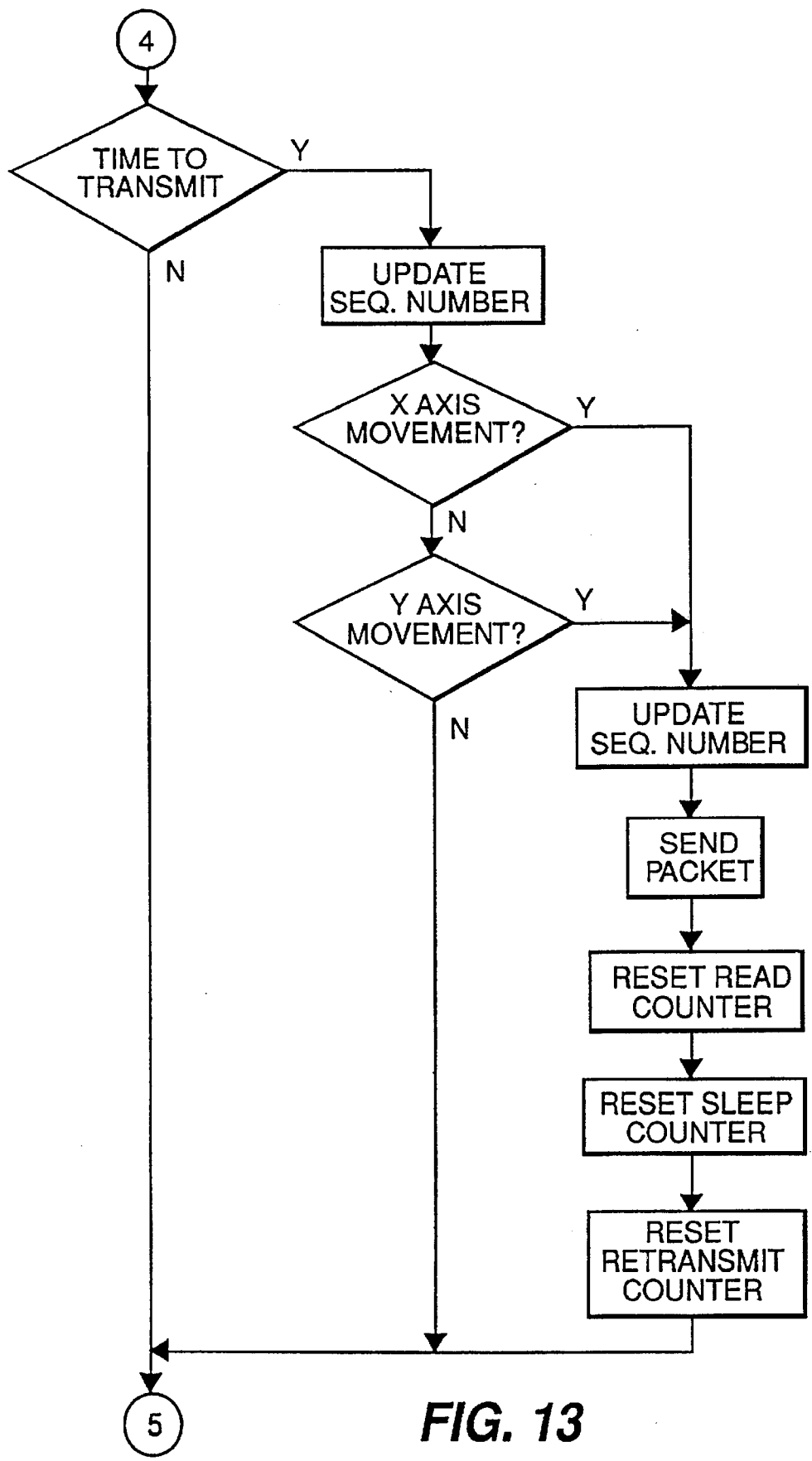
Figure 14:
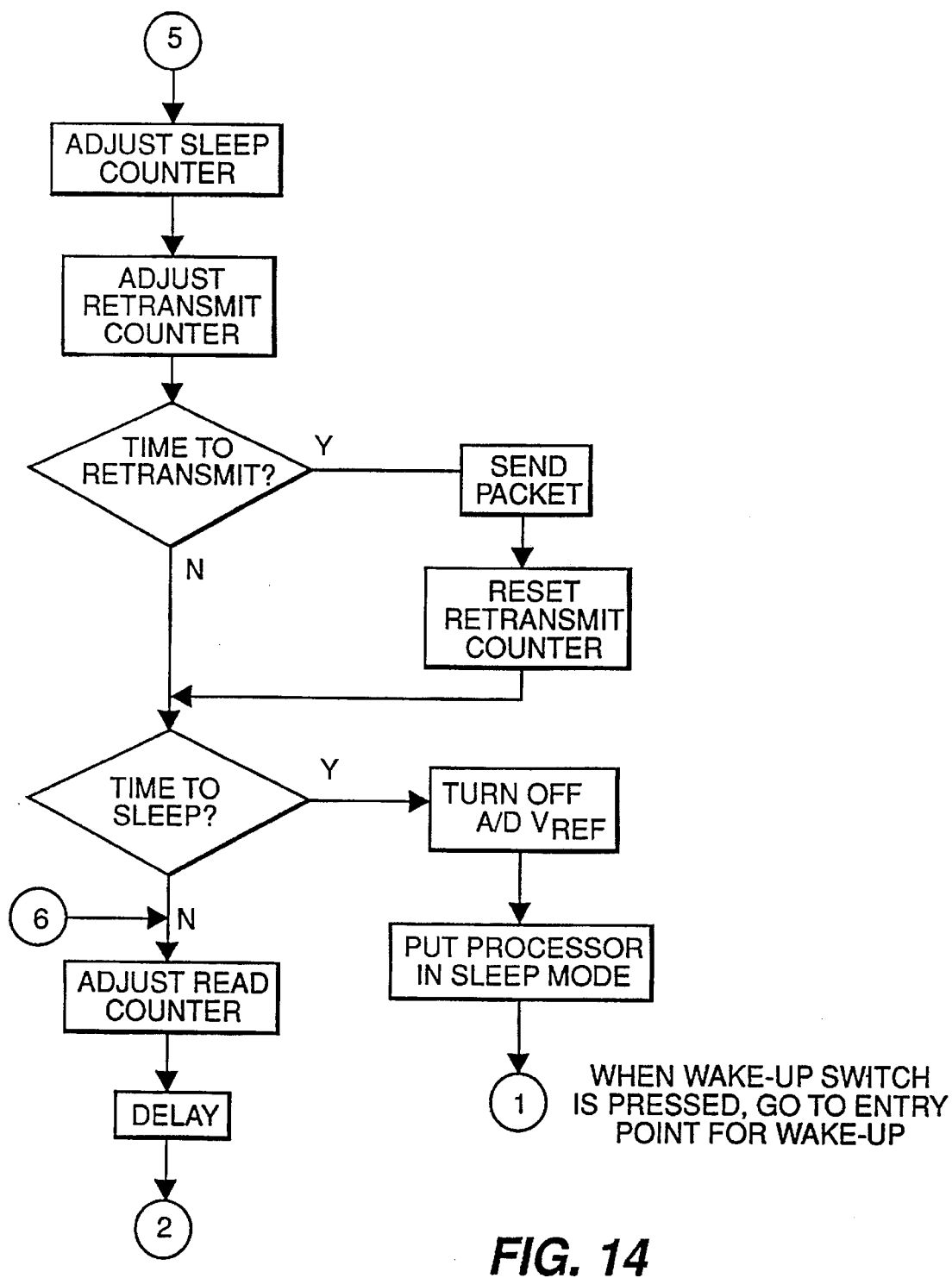
Figure 15:
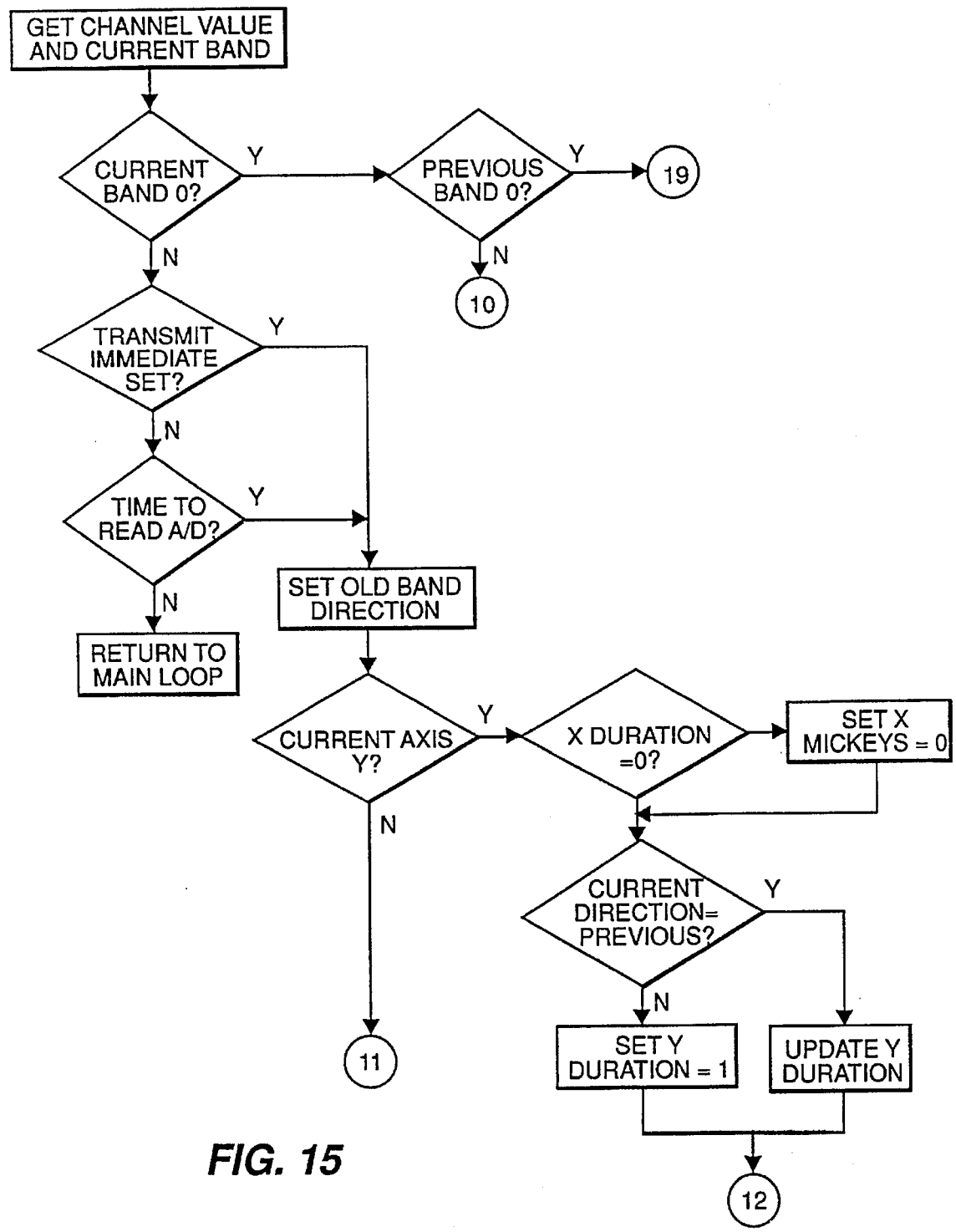
FIGS. 15–20 are a flow chart of the logic of the software for the analog to digital converter channels of FIG. 11.
Figure 16:
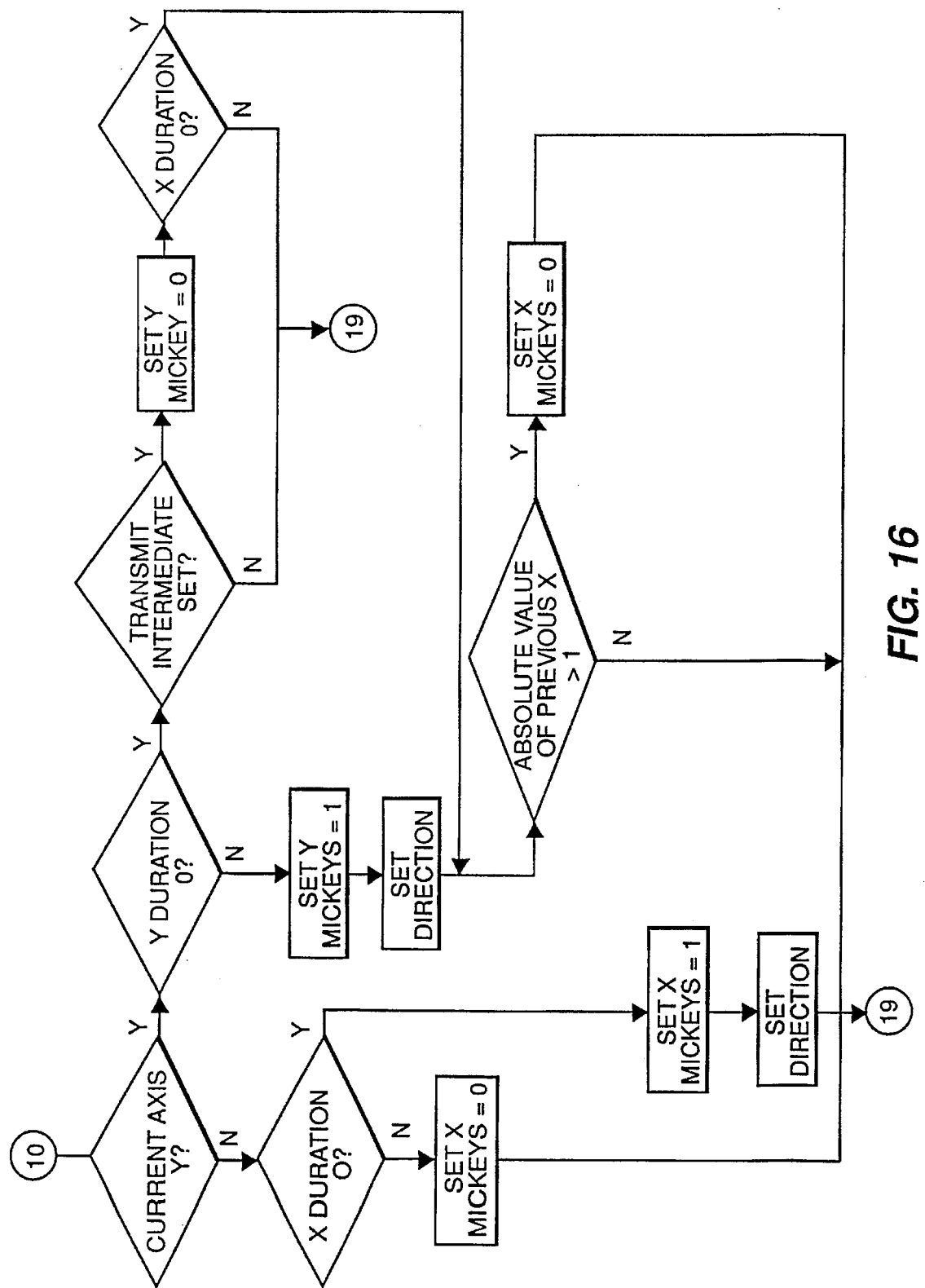
Figure 17:
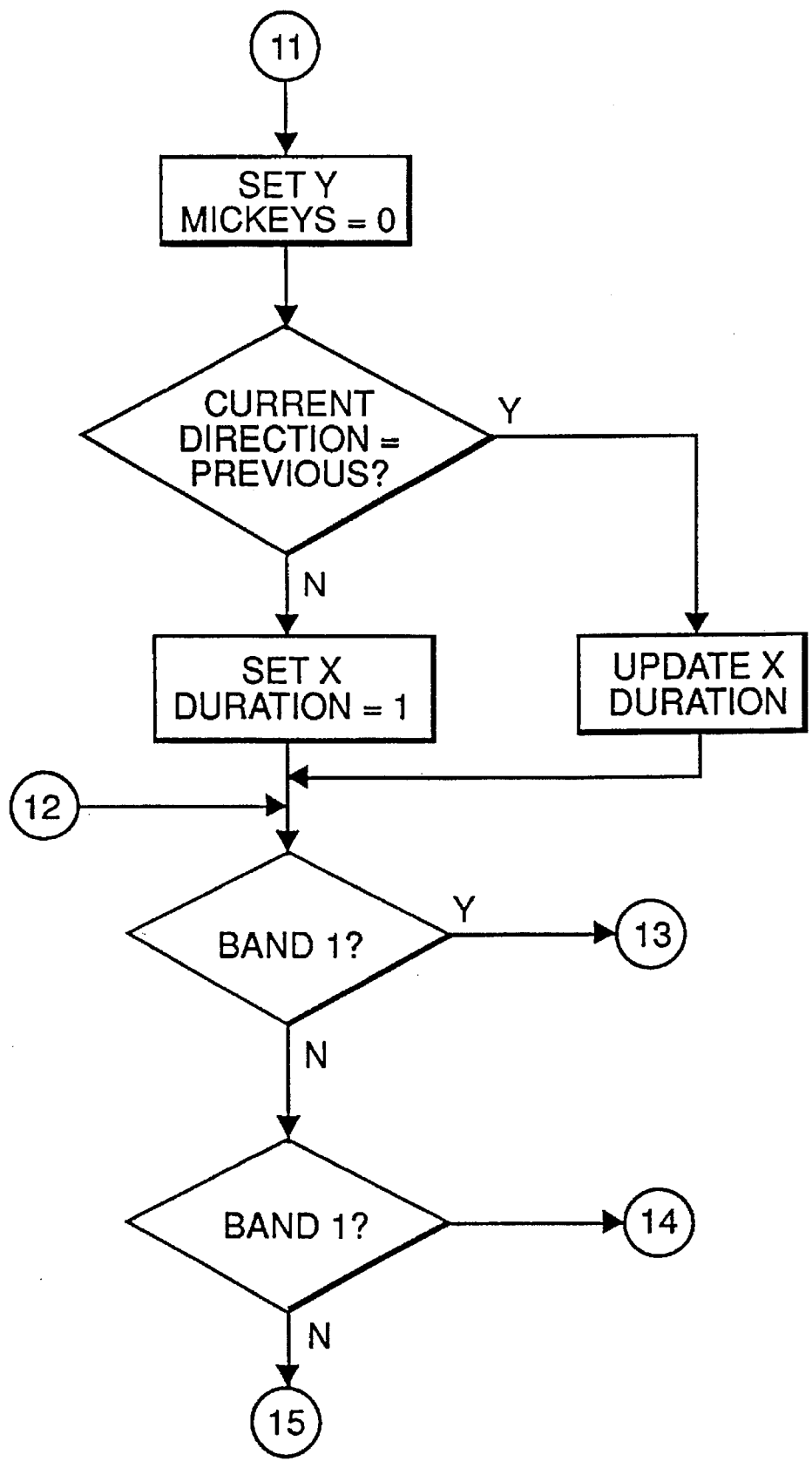
Figure 18:
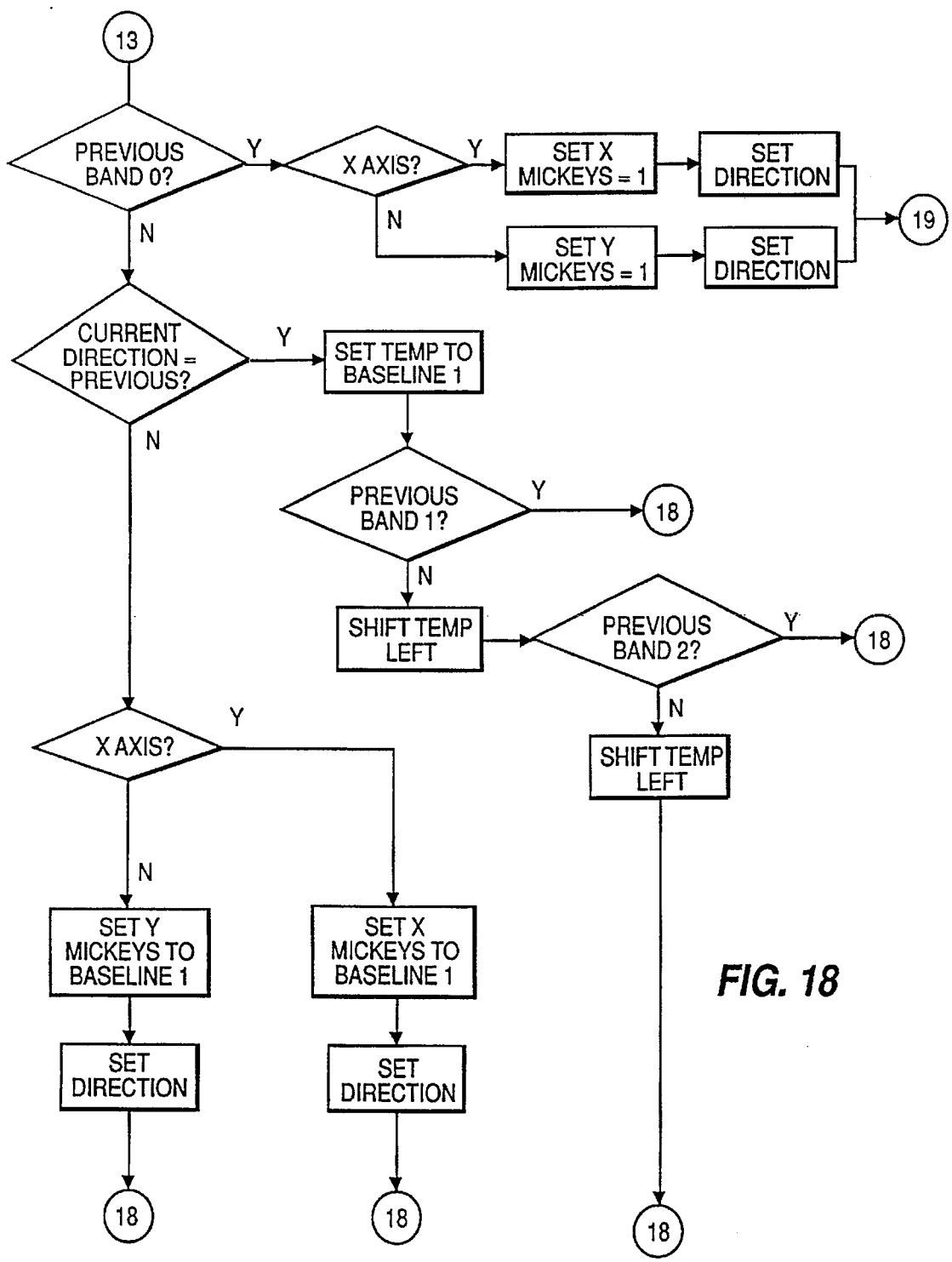
Figure 19:
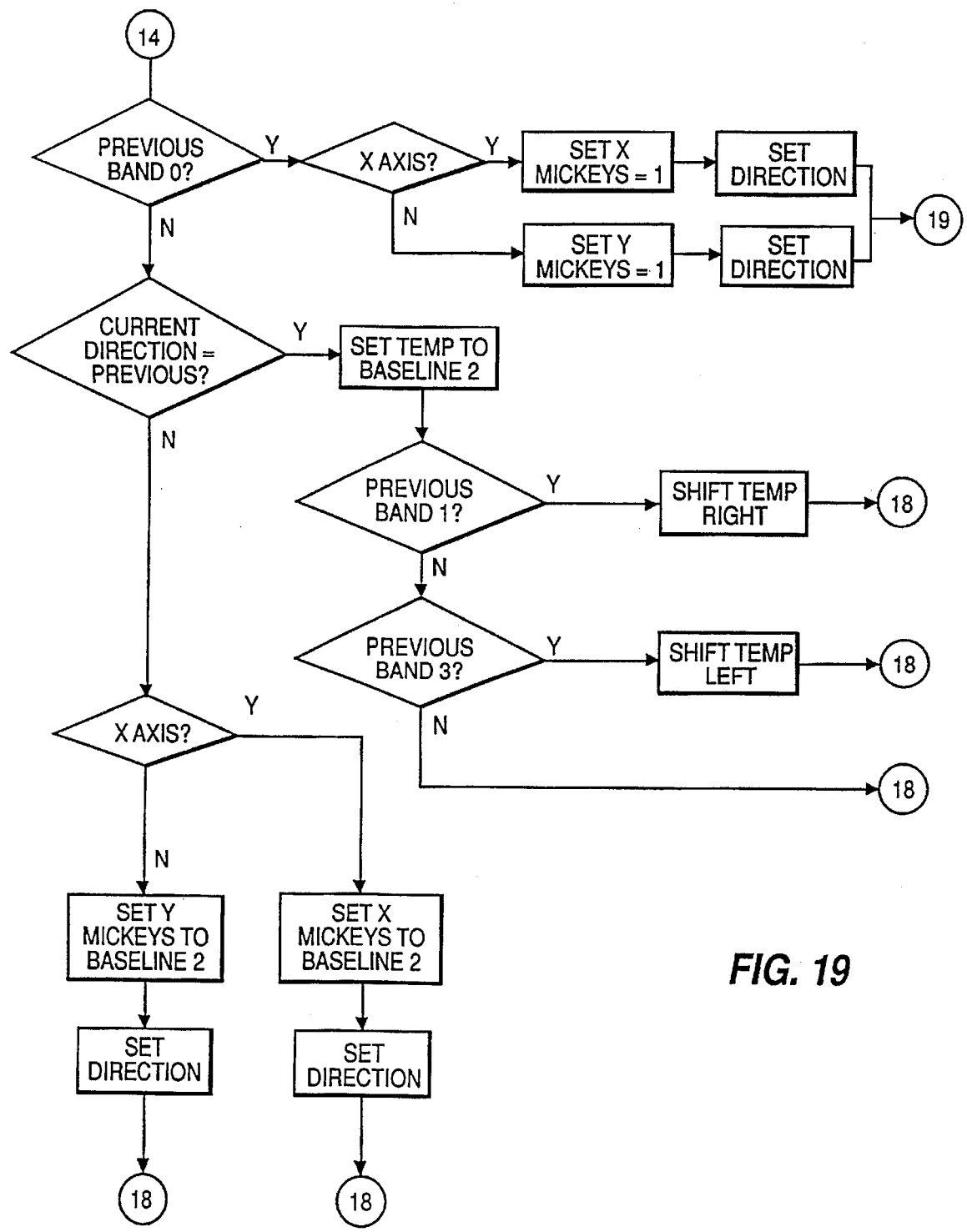
Figure 20:
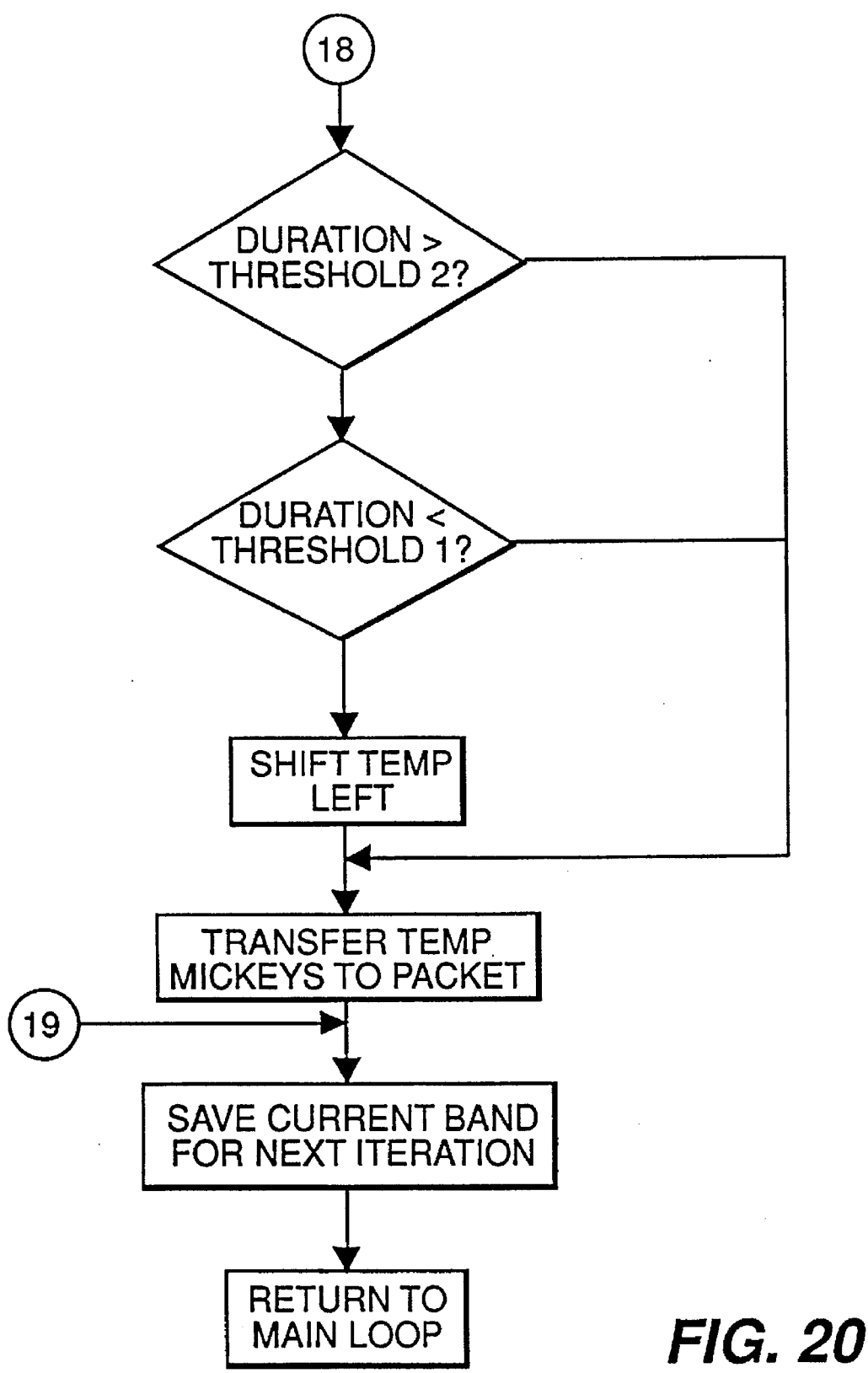

Referring to FIGS. 3 and 9, the transducer is constructed as follows: A substantially circular disc 55 of polyester or the like of appropriate size for insertion in the opening 48 in the transmitter housing has deposited on it the conductors 49 in the configuration shown. Next, a layer of carbon 50 is deposited in the shape and orientation shown to form a part of the potentiometer for one axis. Then a dielectric ring 51 and dielectric center block 52 are laid in place and a second carbon layer 53 is deposited forming a part of the potentiometer for the other axis. Terminal 54 is then put in place followed by a ring 60 of polyester or the like and conductors 57 and silver layer 56 which overlays carbon 50 to complete the potentiometer for the first axis. Dielectric ring 58 and dielectric block 59, both oriented as shown, are put in position and then silver layer 61 completing the potentiometer for the second axis. A top disc 35 of polyester or the like similar to disc 55 is placed on top of the transducer thus formed and the whole assembly is sealed by suitable means. Mechanically the five electrical connections are brought out in a flexible ribbon cable 160 with a connector, not shown, at the end or flexible ribbon cable 160 may plug directly into connector 161. For both axes, when resistive elements are polarized, the overlay potential is one-half the total voltage when no pressure is applied. Therefore, it is possible to generate voltages corresponding to a four quadrant Cartesian system with its origin at ½ Vx and ½ Vy.

Pressure responsive resistance material of the type herein described and used to form the potentiometer as hereinafter described is available as a SoftPot (trademark) membrane potentiometer from Spectra Symbol Corp., Salt Lake City, Utah.

Also included in the transmitter of the invention are four momentary contact switches 18, two of which are shown schematically, designated for operation by either the right or left hand thumb or finger while the transmitter is being held in the right or left hand, respectively. These switches are used in conjunction with the cursor position control to provide a dragging operation on the screen and/or may be assigned to control other operations similar to those produced with a mouse button. Switch caps 19 are made of a plastic or other material and so arranged that deformation of the cap or a portion thereof must occur in order to operate one of the switches or movement of the switches is otherwise biased so that the switches will not be accidentally operated merely by the user grasping and picking up the transmitter. Alternatively, switch caps 19 are recessed in the transmitter housing to avoid accidental or inadvertent operation.

Figure 21:
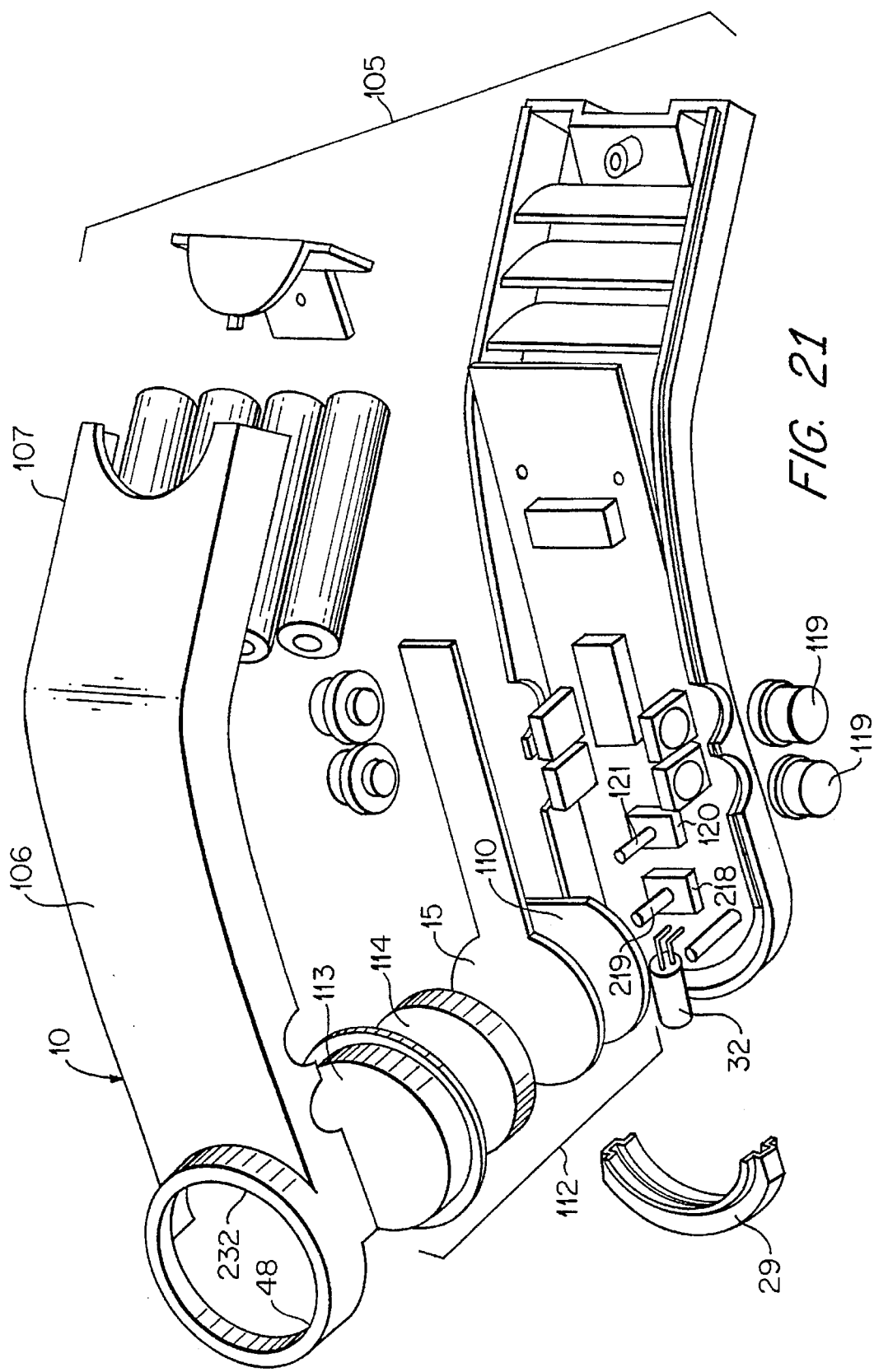
FIG. 21 shows an alternative physical construction of the transmitter.

The transmitter assembly also includes an initiation or "wake up" switch 20 and a switch cap or actuator 21 therefor and a battery pack or other source of electrical power 28. A lens 29 through which infrared signals are transmitted is provided and an infrared signal source 32 is located inside the transmitter head behind the lens 29. The transmitter may be powered by dry cell batteries or a similar source of portable electric power, such as four size AAA batteries as shown in FIG. 21.

Transmitter functions are executed by a microcontroller represented by the block 22. Software for the microcontroller is stored in a Read Only Memory (ROM). A printout of each of two of the computer program listings which may be used to control the microcontroller are appended to this specification. Transmitter function sequence begins when the initiation switch is actuated. As will appear from the description of transmitter function and control, the logic and software utilized in this invention are unique and novel. The logic and software are designed to respond to the probable intent of the user in operating the control as well as the specific action taken by him. At the same time, the invention is compatible with existing host computer software and can be used with computers having mouse and/or trackball pointing devices without modification to the host computer or with minimal retrofit modification. A flow chart of the software program logic is shown in FIGS. 10 through 14. A flow chart of the process within the analog to digital channel is shown in FIGS. 15 through 20.

Every transmitter unit has a unique hardware encoded identifying number. When power is first applied to the transmitter, for example when batteries are first inserted, the identifying number is read and stored in Random Access Memory (RAM) in the transmitter. All subsequent communications sent from that transmitter will contain that identifier. This affords a means of identifying the source of a communication sent to a receiver and to a host computer and also provides a means for rejecting data sent from a transmitter not intended to be in communication with a computer already in communication with another transmitter.

Returning to FIG. 2, it can be seen that disc 13 has a generally concave top surface 23 and a generally convex bottom surface 24. The bottom surface also has molded projecting surfaces 25 resembling a formee cross and generally congruent with and overlying the resistance strips 16, 17 shown in FIG. 3. Alternately bottom surface 24 may be made without the molded projecting surfaces 25. Pad 14 has a generally concave top surface 26 of substantially the same size and shape as bottom surface 24 of the disc 13 and a substantially flat bottom surface 27 which is in contact with the top surface of the polyester disc 35 of the top one of pressure responsive resistance strips 16, 17 but does not apply sufficient pressure thereto to affect the resistance thereof unless pressure is being applied to disc 13. Switches 18 and 20 and microcontroller 22 are indicated schematically only in the drawings. When pressure is applied to disc 13 on a portion thereof corresponding generally to the direction in which it is desired to move the cursor, the disc will move in a generally rocking motion, compressing a portion of one or both of the resistance strips 16, 17 and changing the voltages at the corresponding voltage terminals 37, 38, 39 or 40.

In an alternate construction and orientation of the position control and transmitter as shown in FIG. 21 initiation or wake up switch 120 and dragging or clicking switch 218 have their operators 121 and 219 respectively located underneath position control 112. A substantially rigid plate 110 is positioned between the thick film position transducer 15 and the switch operators 121 and 219. Plate 110 may be made of plastic or similar material and is adhered or otherwise secured to transducer 15. Switches 120 and 218 offer sufficient resistance to operation by switch operators 121 and 219 that they are not inadvertently operated by normal pressure on control disc 113 to effect cursor movement. However, by pressing with slightly greater force the initiation switch or the clicking or dragging switch can be actuated when desired. As can be seen this can all be accomplished using only a single digit of the hand. This is particularly useful when using the invention with software for computer graphics.

Completing the construction of the position control 112 are pad 114 and control disc 113. As may be best seen in FIG. 27, pad 114 is a relatively thick cylindrical pad which has relatively flat top surface 126 shown in FIG. 27B and a bottom surface 127 which has relatively flat lobes 227 which outline a recessed formee cross 125 and which lobes overlie the formee cross shape of the position transducer 15. As shown in FIG. 27 the recess forming the formee cross 125 increases in depth from the outer diameter of the pad 114 to a predetermined maximum depth at its center. Pad 114 is made of a relatively soft, yielding and resilient material so that pressure applied to disc 113 will be transmitted to a relatively broad surface of potentiometer 15 through the material of the pad. As seen in FIG. 27 the pad 114 has a series of apertures 201 which are used in a manner hereinafter described to keep the lobes 227 in alignment over the legs of the potentiometer and with the corresponding sectors of disc 113 so that pressure in a given orientation of the control disc 113 will result in a signal to move the cursor in the corresponding direction.

Control disc 113 is actually a flanged, cup-shaped member made in one piece of a plastic or similar material as seen in FIG. 28. Looking now at FIG. 29, the disc 113 is seen to have a series of projecting pins 202 corresponding in number and placement to the apertures 201 in pad 114. For ease of insertion in the apertures 201, pins 202 may be slightly smaller at their free ends than at their bases. Disc 113 also has a flange 203 around its circumference. Flange 203 is provided with one or more alignment notches 206 which keep the position control 112 properly oriented within the transmitter housing by mating with corresponding registry ridges or splines, not shown, on the inside of the transmitter housing. The top surface 204 of control disc 113 is slightly convex and the bottom surface 205 is generally flat to provide even contact with the top surface of pad 114.

Switch 120 and its operator 121 are located substantially under the center of plate 110 and position control 112 so that operator 121 serves as a pivot point for plate 110. Pressure on a given sector of control disc 113 will cause the assembly comprising position control 112 to rock gently over the pivot point formed by switch operator 121.

As can best be seen in FIG. 21, when the type of position control 112 is used then the opening 48 in the top half 10 of the transmitter housing is a through opening and the position control 112 rests on switch operators 121 and 219 with the control assembly being retained in the housing by disc 113 and the cooperating elements of transmitter case 6. It is to be understood that the outer diameter 230 of pad 114 is slightly smaller than the inner diameter 231 of disc 113 and that the inner diameter 232 of opening 48 is slightly larger than the outer diameter 233 of disc 113 but smaller than the outer diameter of the flange 203.

Position control 112 can be assembled by positioning and cementing potentiometer 15 on disc 110, placing pad 114 on potentiometer 15 with lobes 227 overlying the corresponding lobes of the formee cross sectors of potentiometer 15 and then placing disc 113 over pad 114 with pins 210 aligned with apertures 201 and with notches 206 aligned with the guide splines in the transmitter housing.

Position data and control can be sent from the transmitter 3 to the receiver 2, clicking and dragging operations can be controlled and the transmitter can be activated, all by manipulation of control 112 and all by the use of a single digit of the hand of the user. It is contemplated that the user will use his forefinger, but it is obvious that any digit may be used which is comfortable or more desirable for the user.

In the form of transmitter and control shown in FIG. 21, switches 119 are provided which are comparable to switches 19 in the form of transmitter shown in FIG. 2 but all four switches are available for uses other than clicking or dragging operations which in this form of the invention are performed through control 112 and switch 218.

Figure 22:
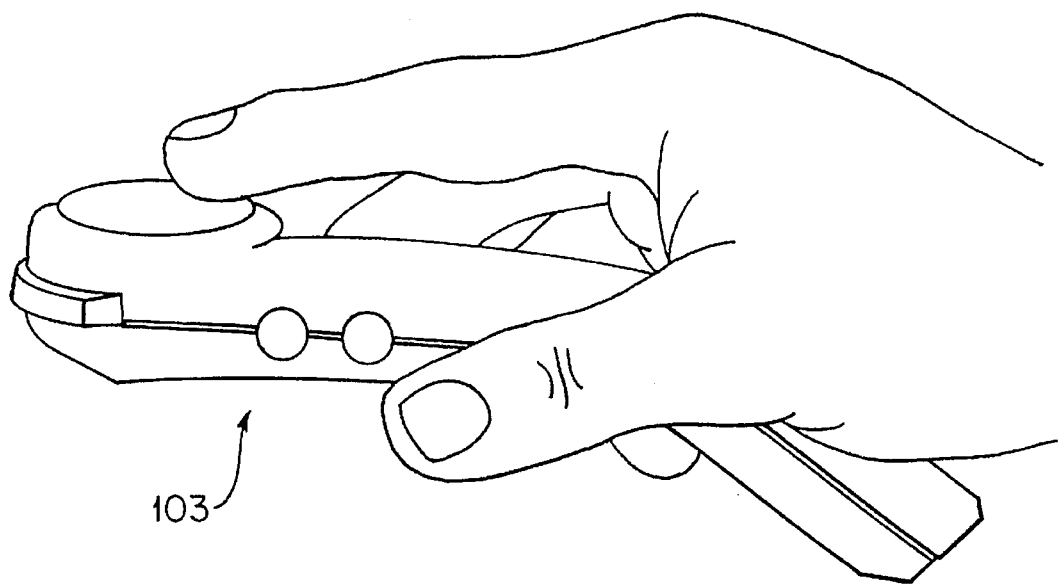
FIGS. 22 and 23 respectively show the form of transmitter depicted in FIG. 21 being supported in the hand of a user and being grasped in the hand of a user while the transmitter is supported on a substantially flat surface.
Figure 23:
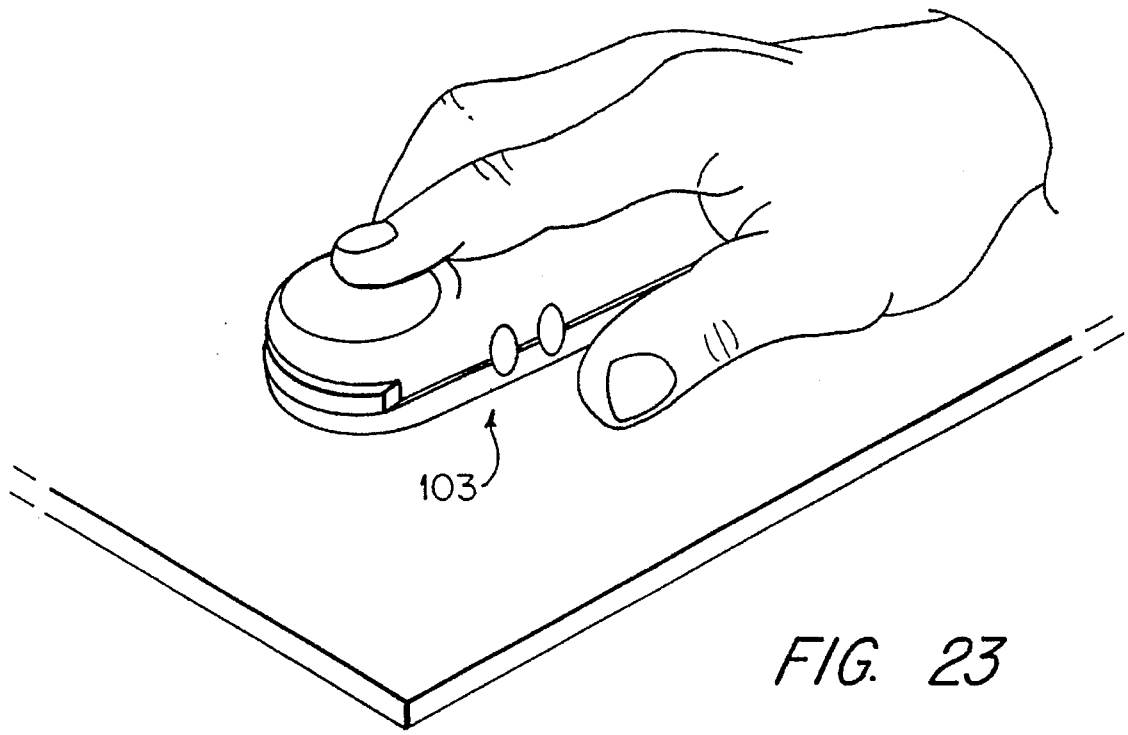
Figure 24:
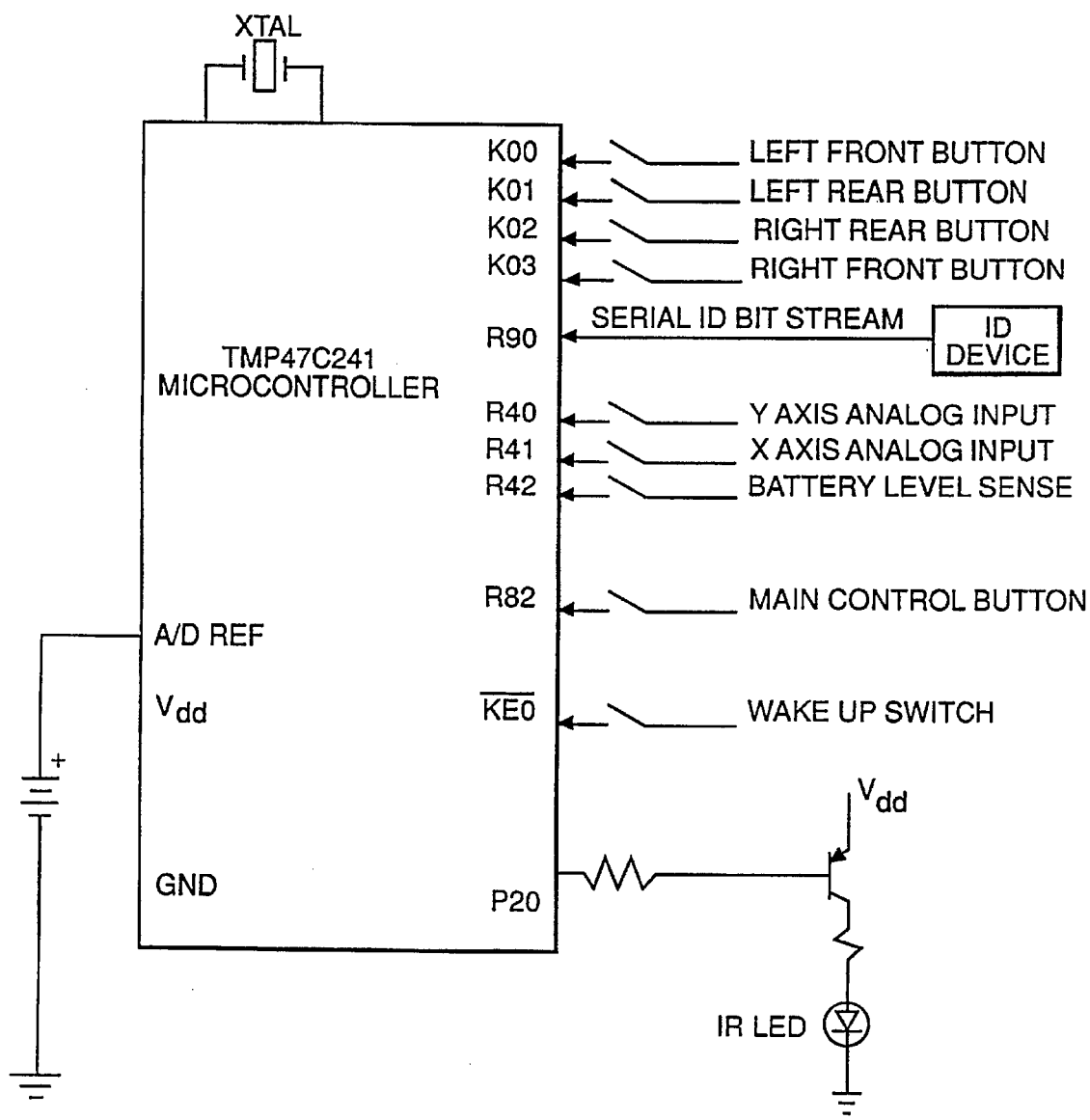
FIG. 24 is a block diagram of a modified form of transmitter designed for operation by a single digit of the hand of an operator.
Figure 25:
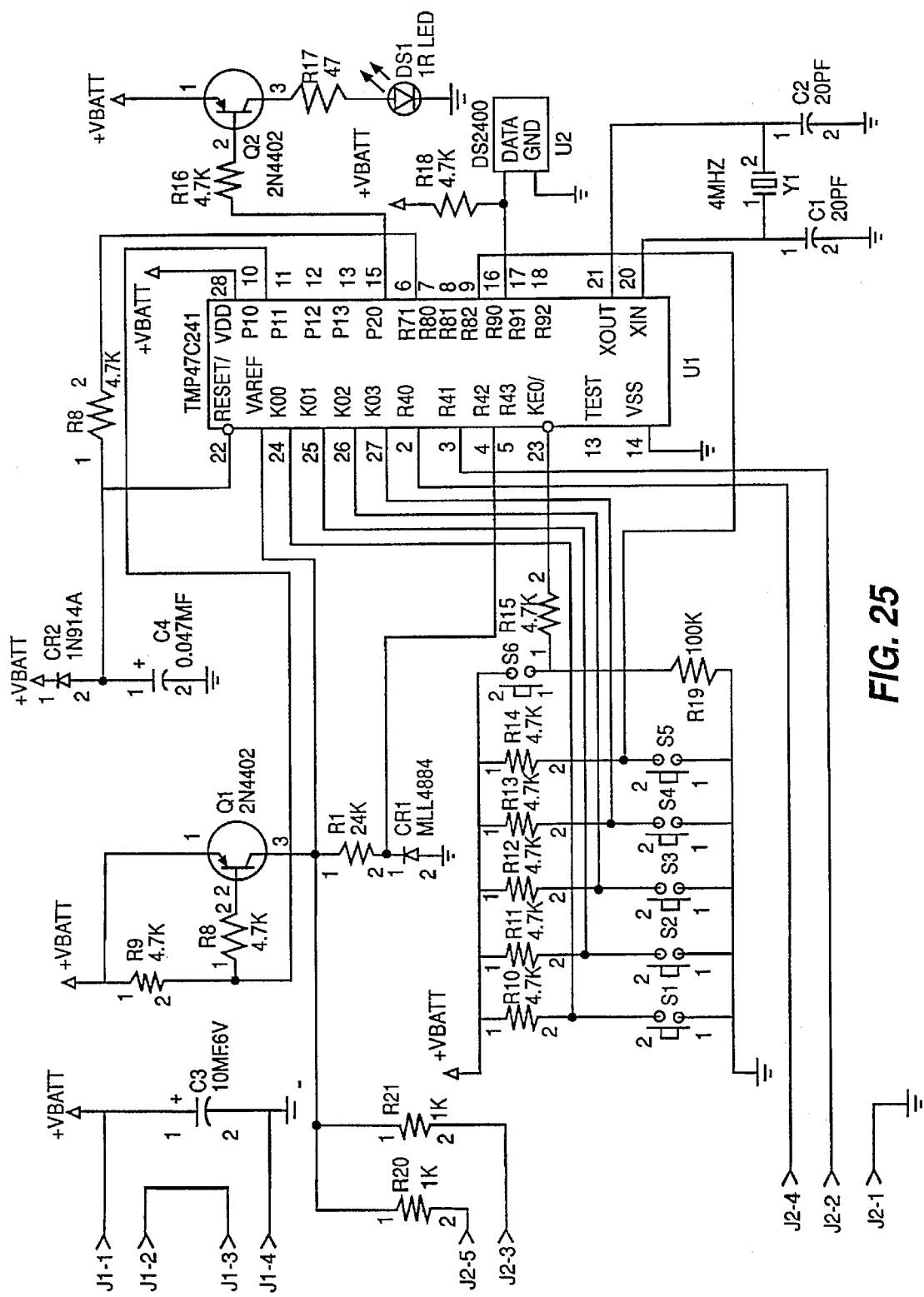
FIG. 25 is a schematic circuit diagram of the modified form of transmitter depicted in FIG. 24.
Figure 26:
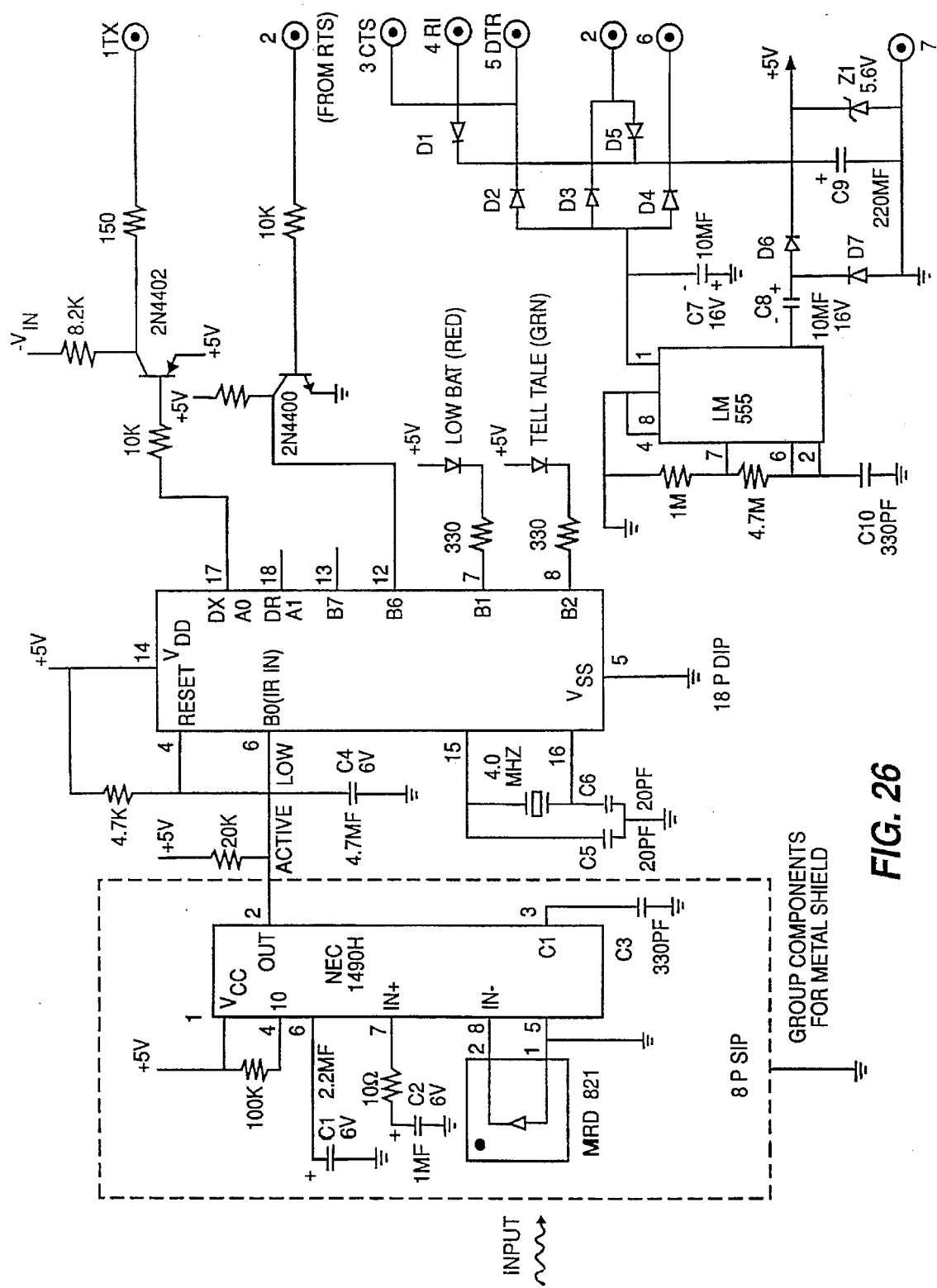
FIG. 26 is a schematic circuit diagram of a form of receiver intended for use with the transmitter of FIGS. 24 and 25.
Figure 30:
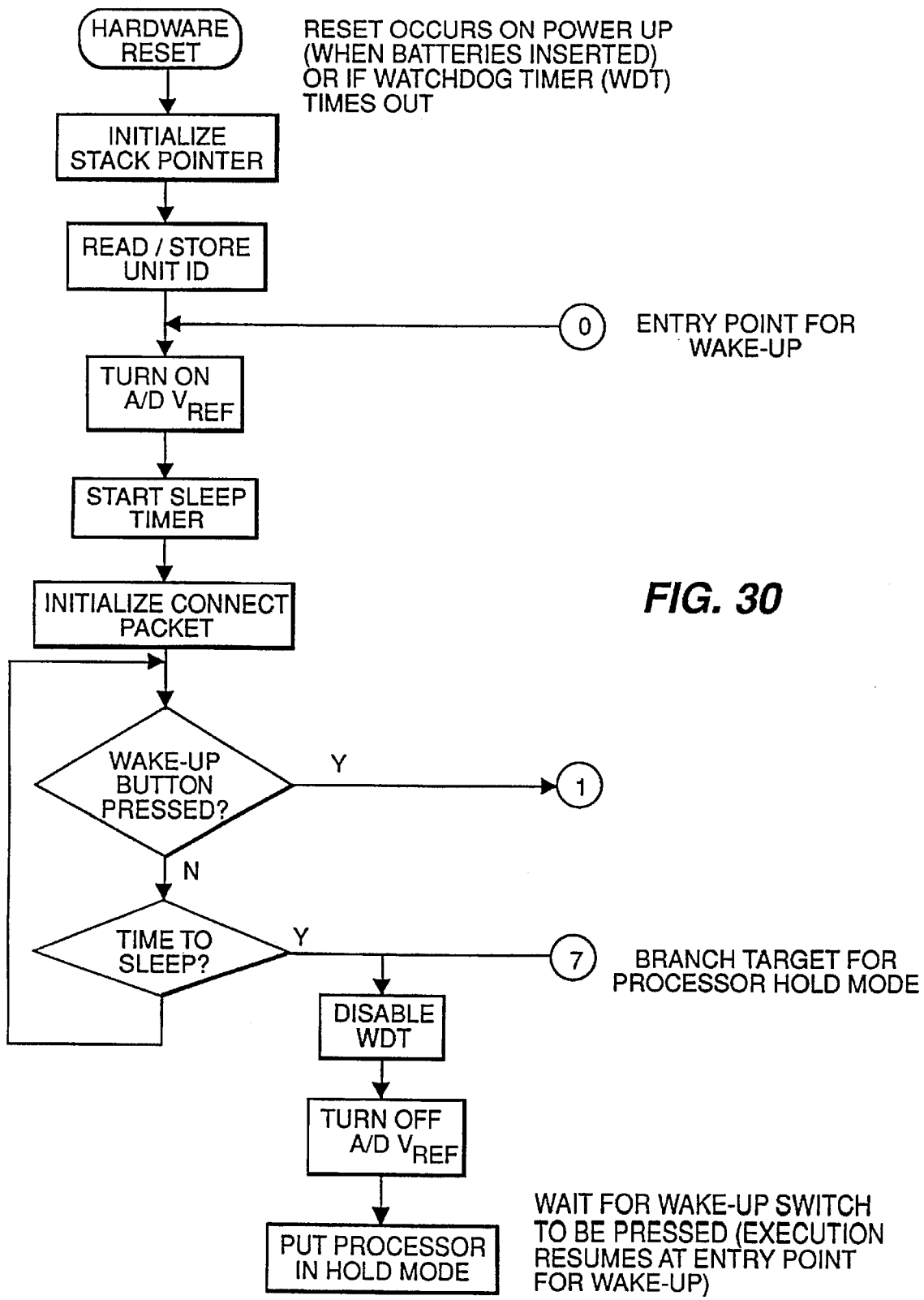
FIGS. 30–34 comprise a flow chart of the logic of the software controlling the transmitter which employs the position control of FIG. 21.
Figure 31:
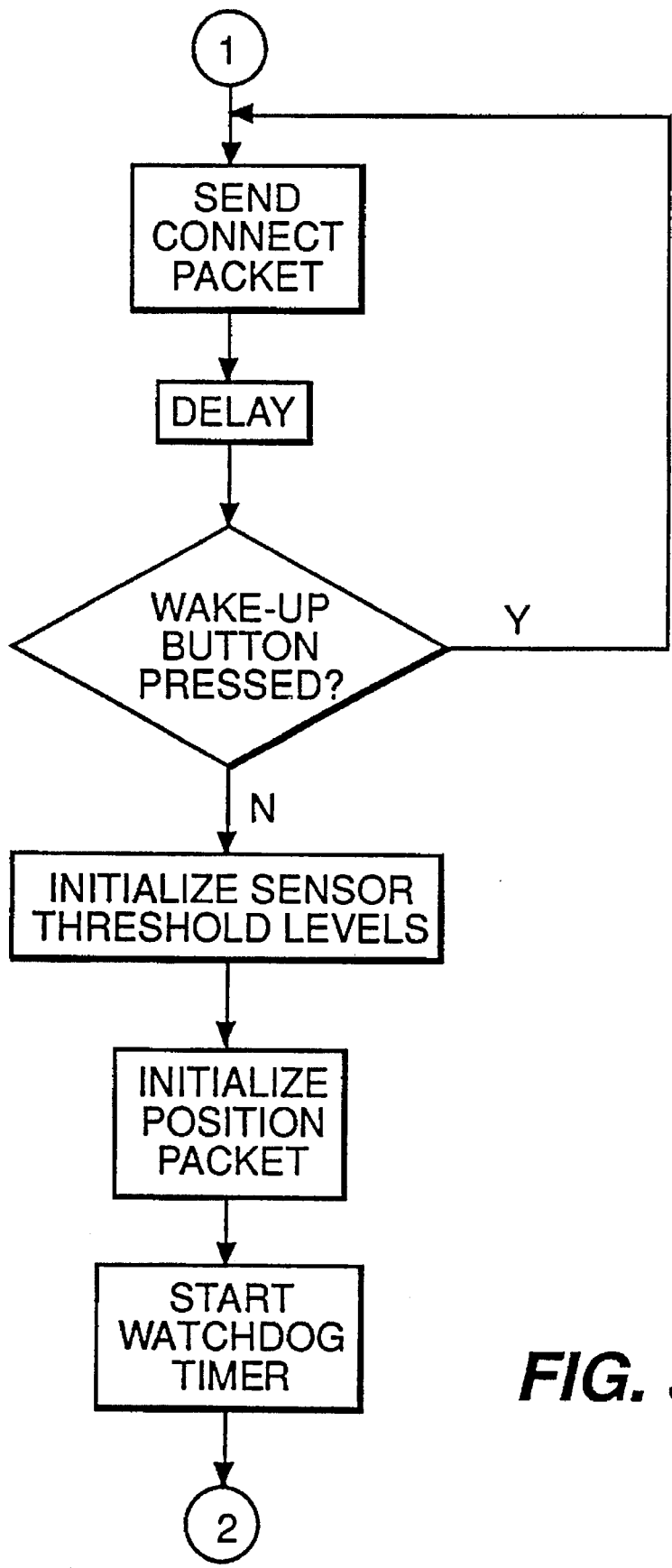
Figure 32:
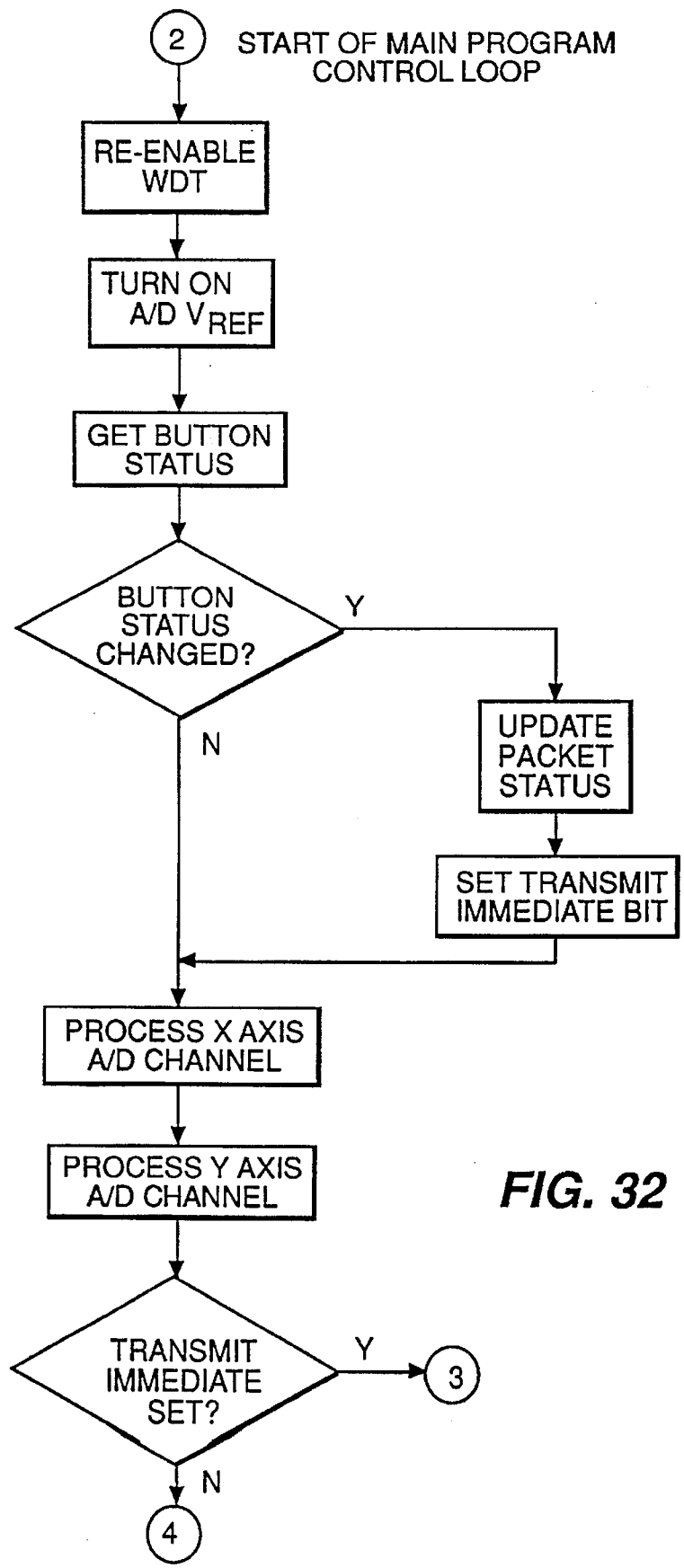
Figure 33:
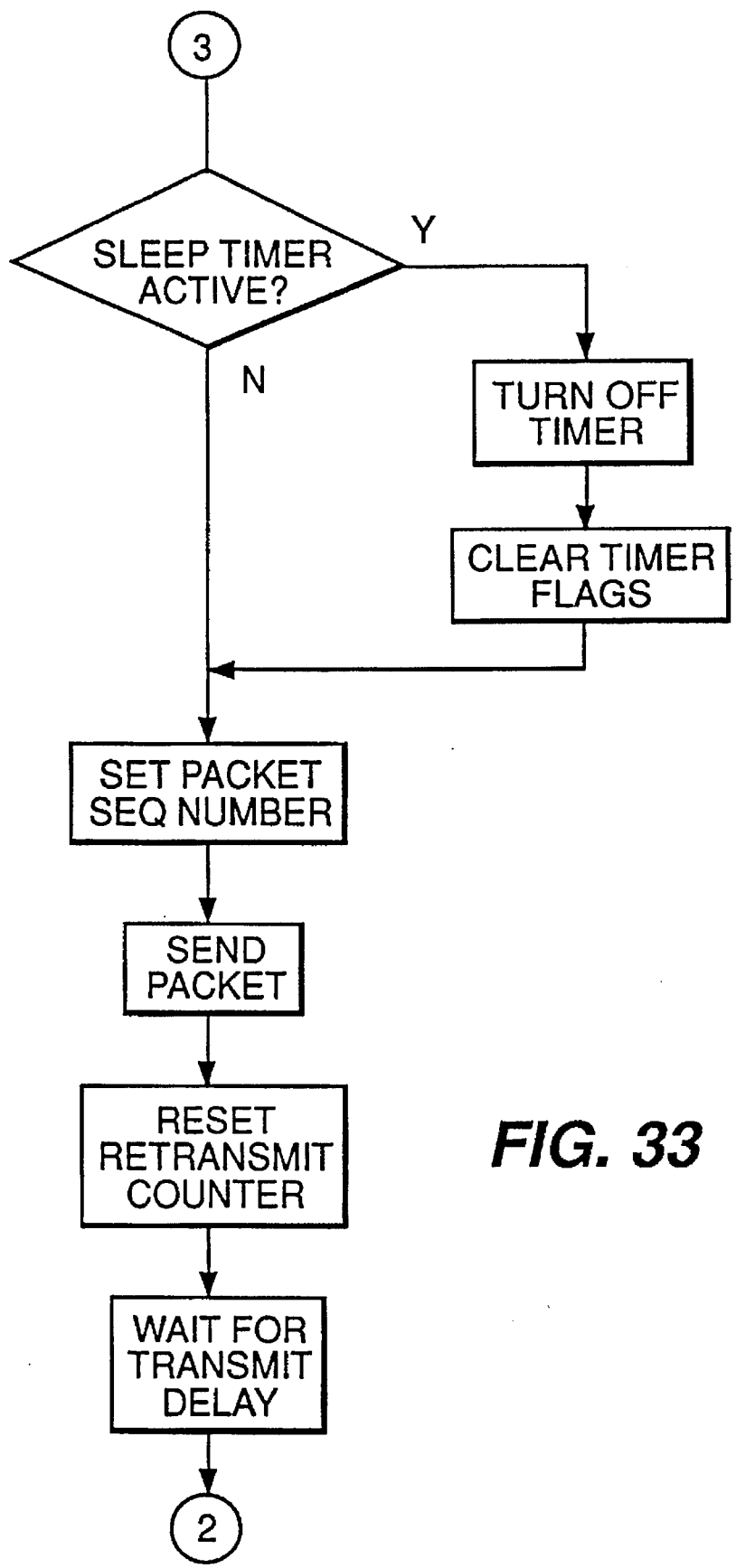
Figure 34:
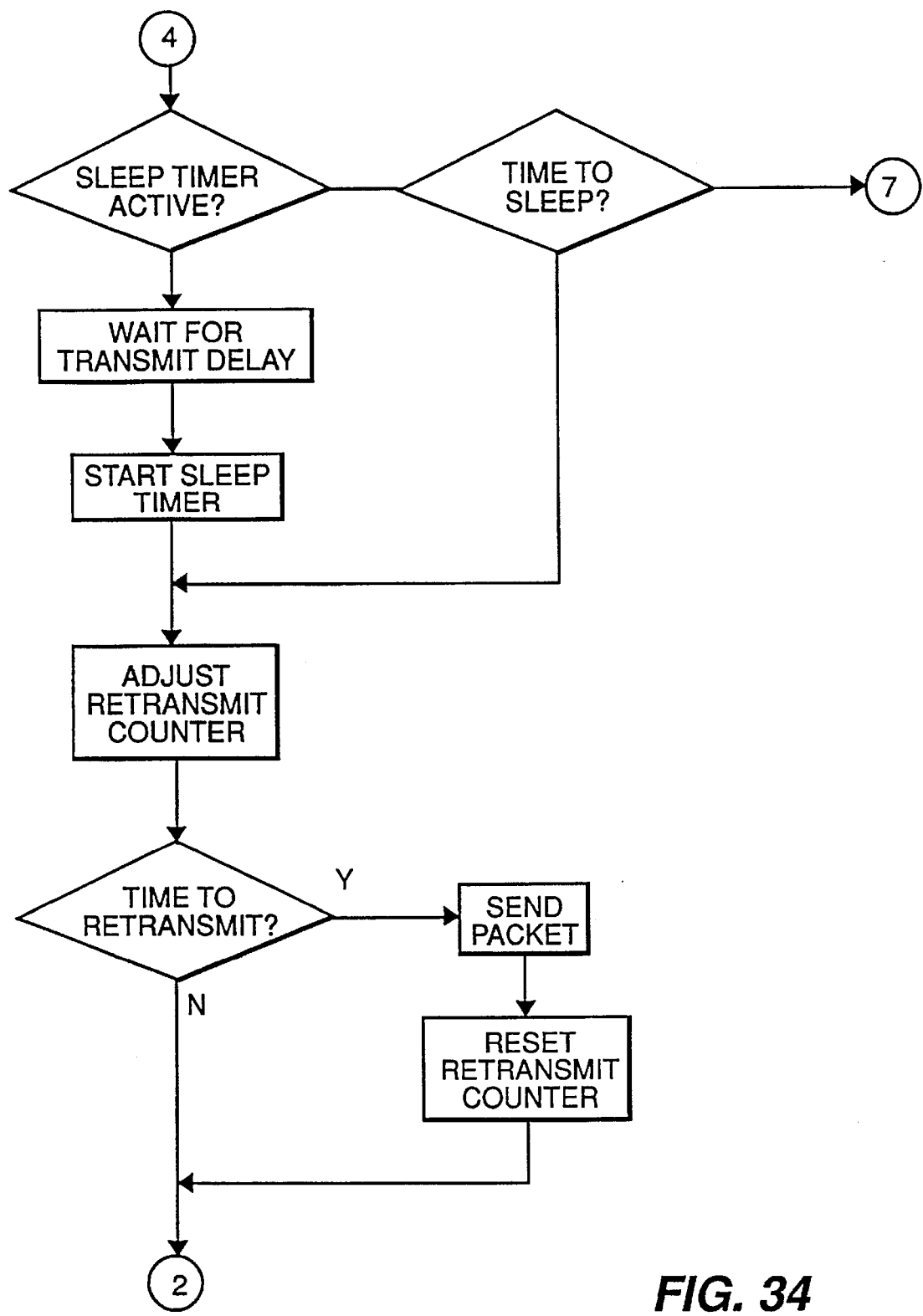
Figure 35:
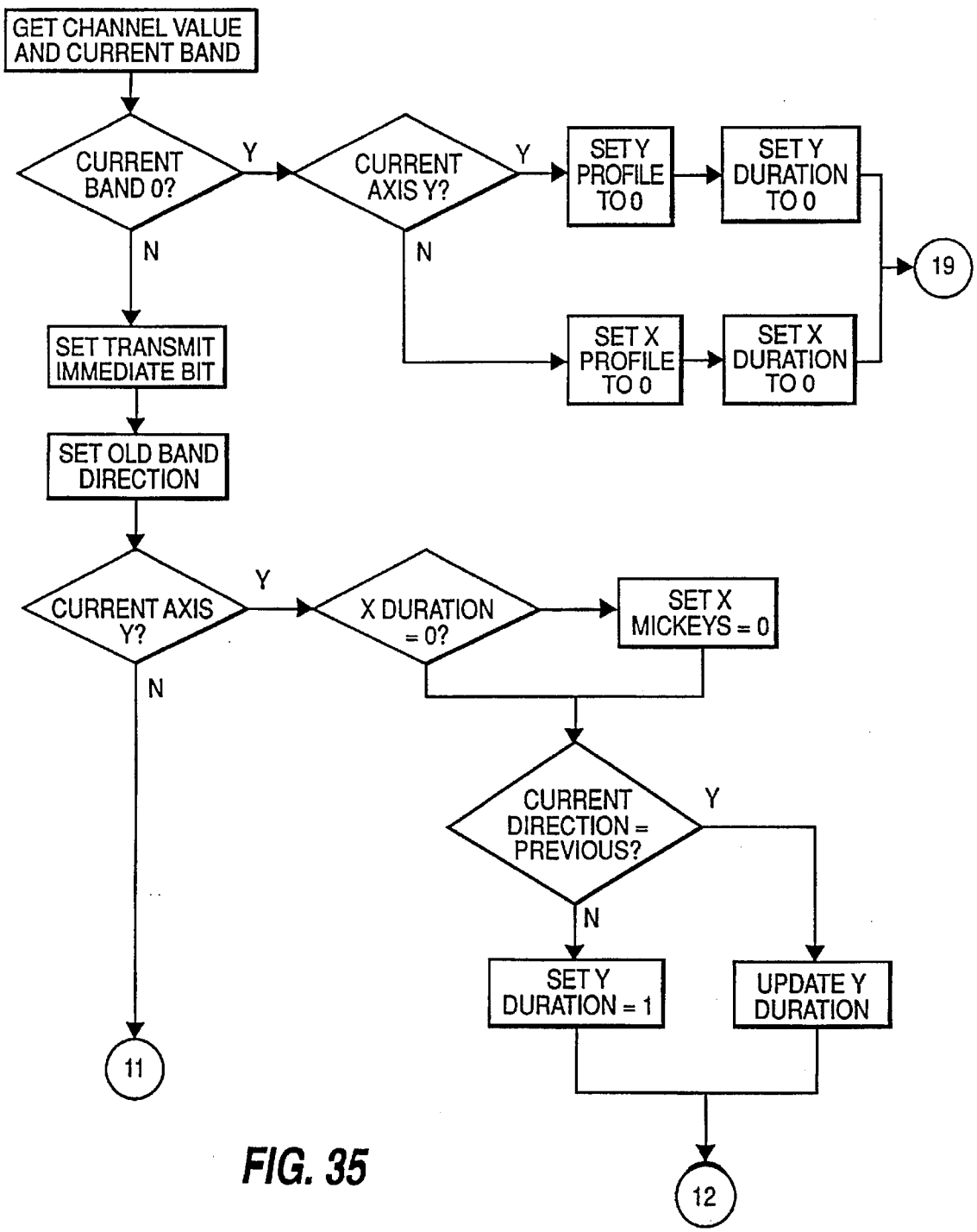
FIGS. 35–40 comprise a flow chart of the logic of the software for the analog to digital converter channels.
Figure 36:
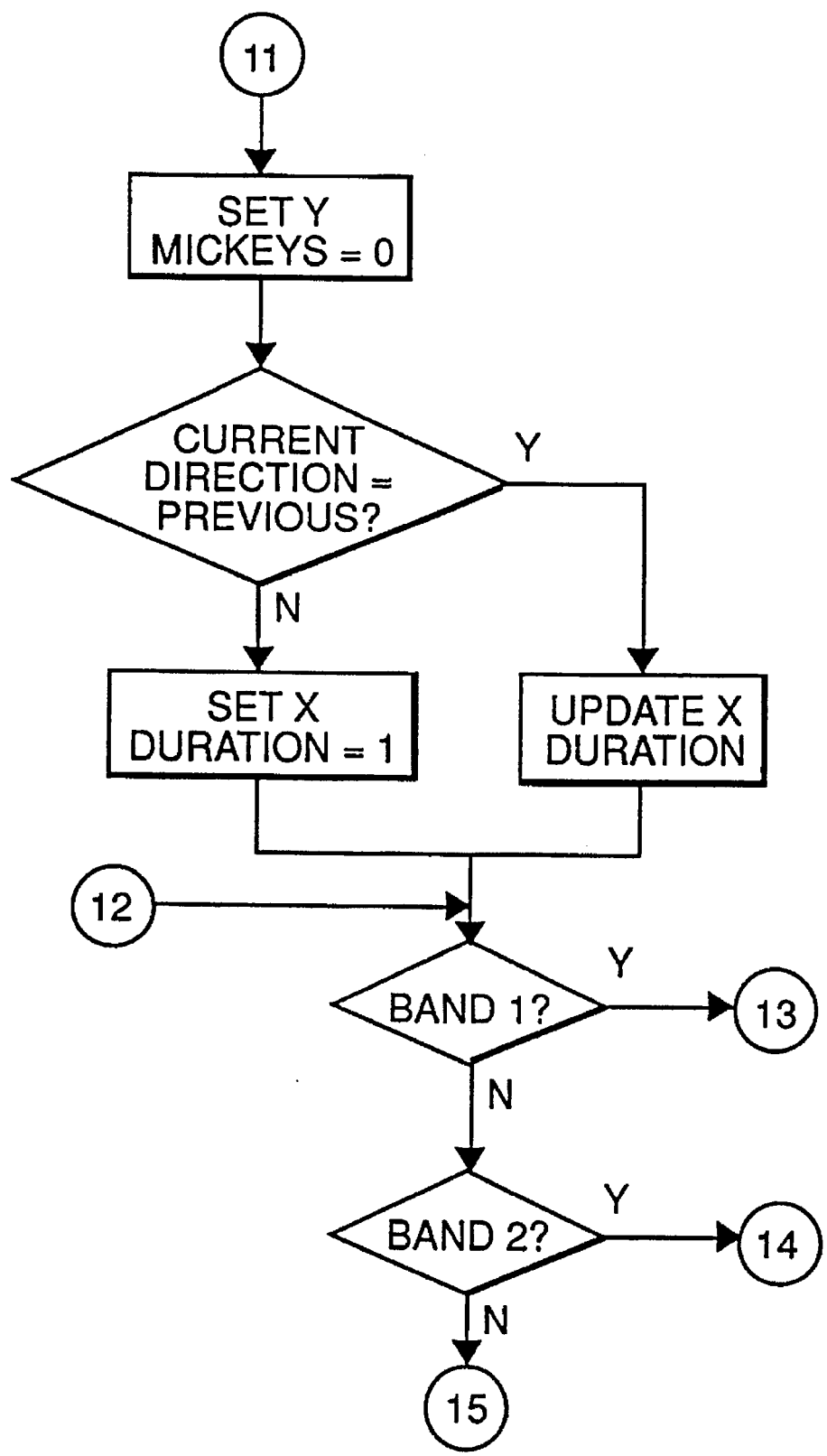
Figure 37:
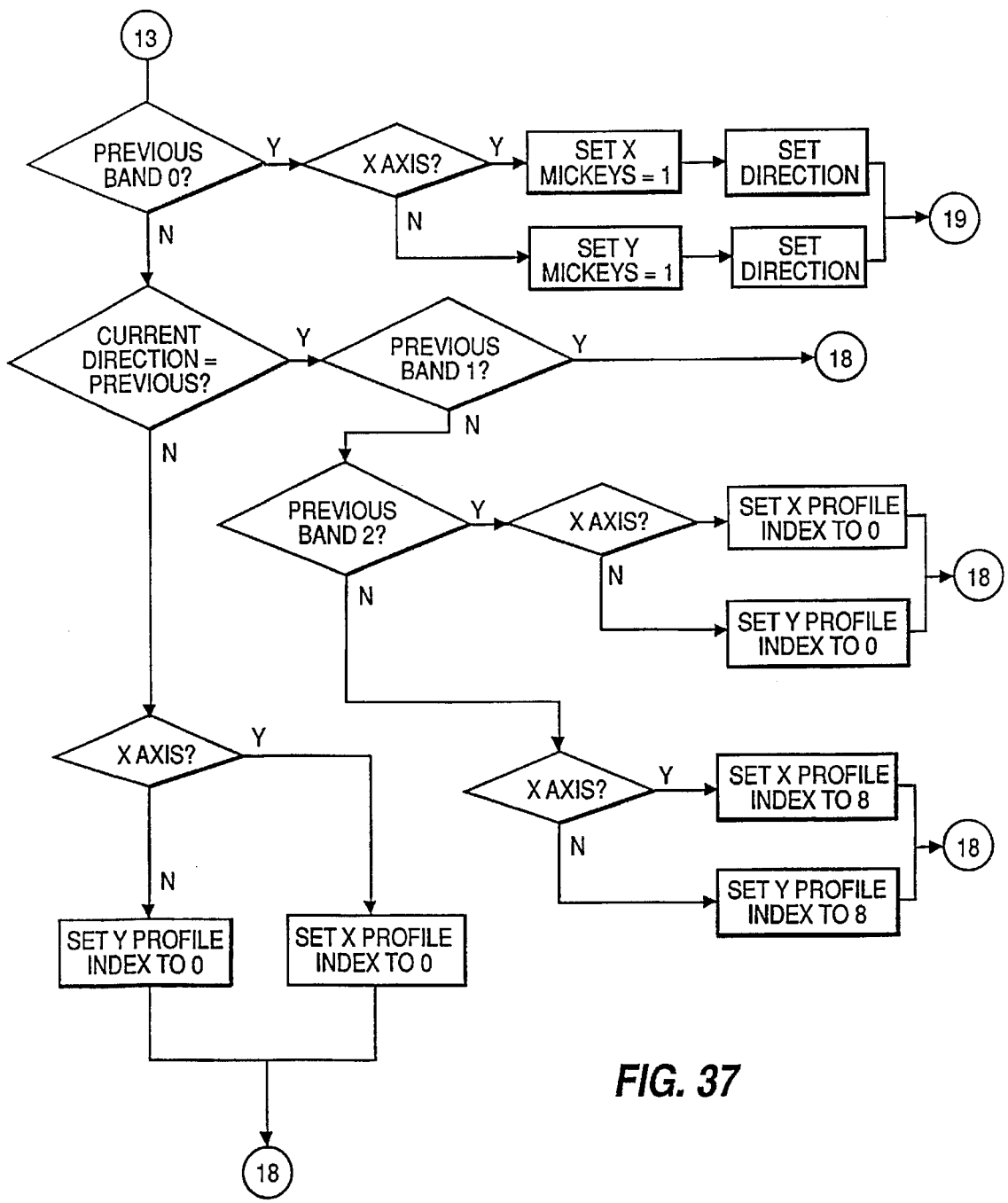
Figure 38:
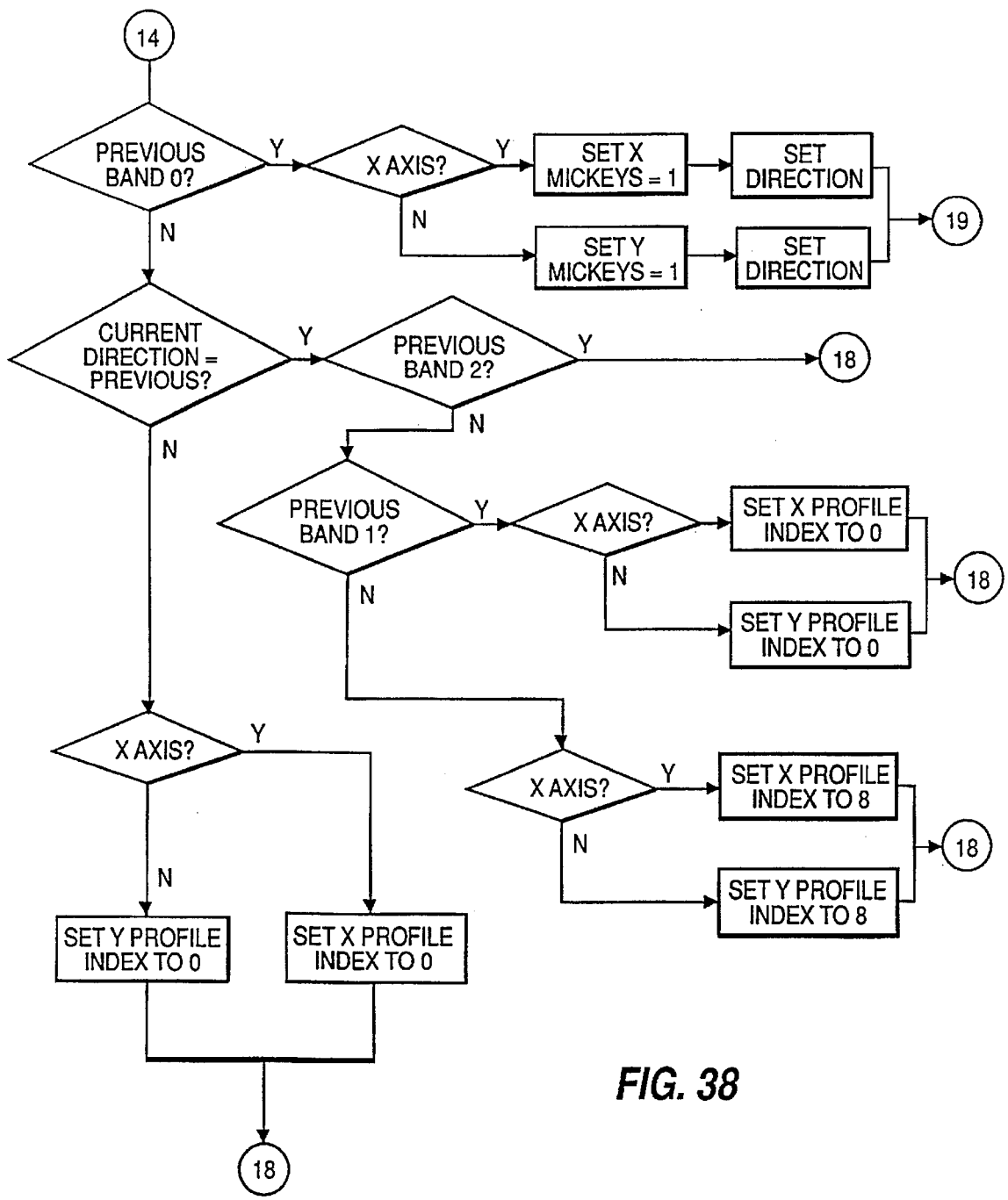
Figure 39:
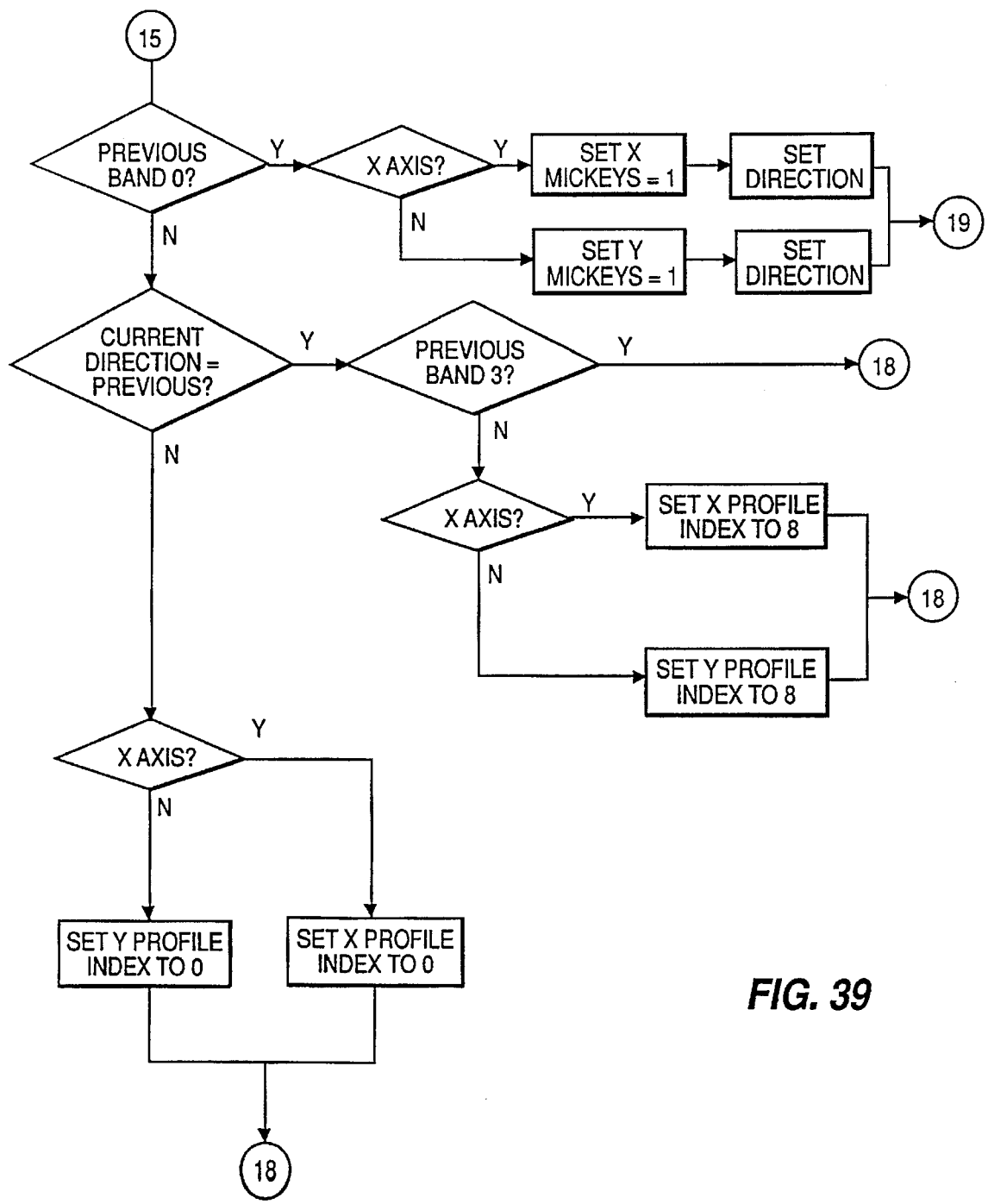
Figure 40:
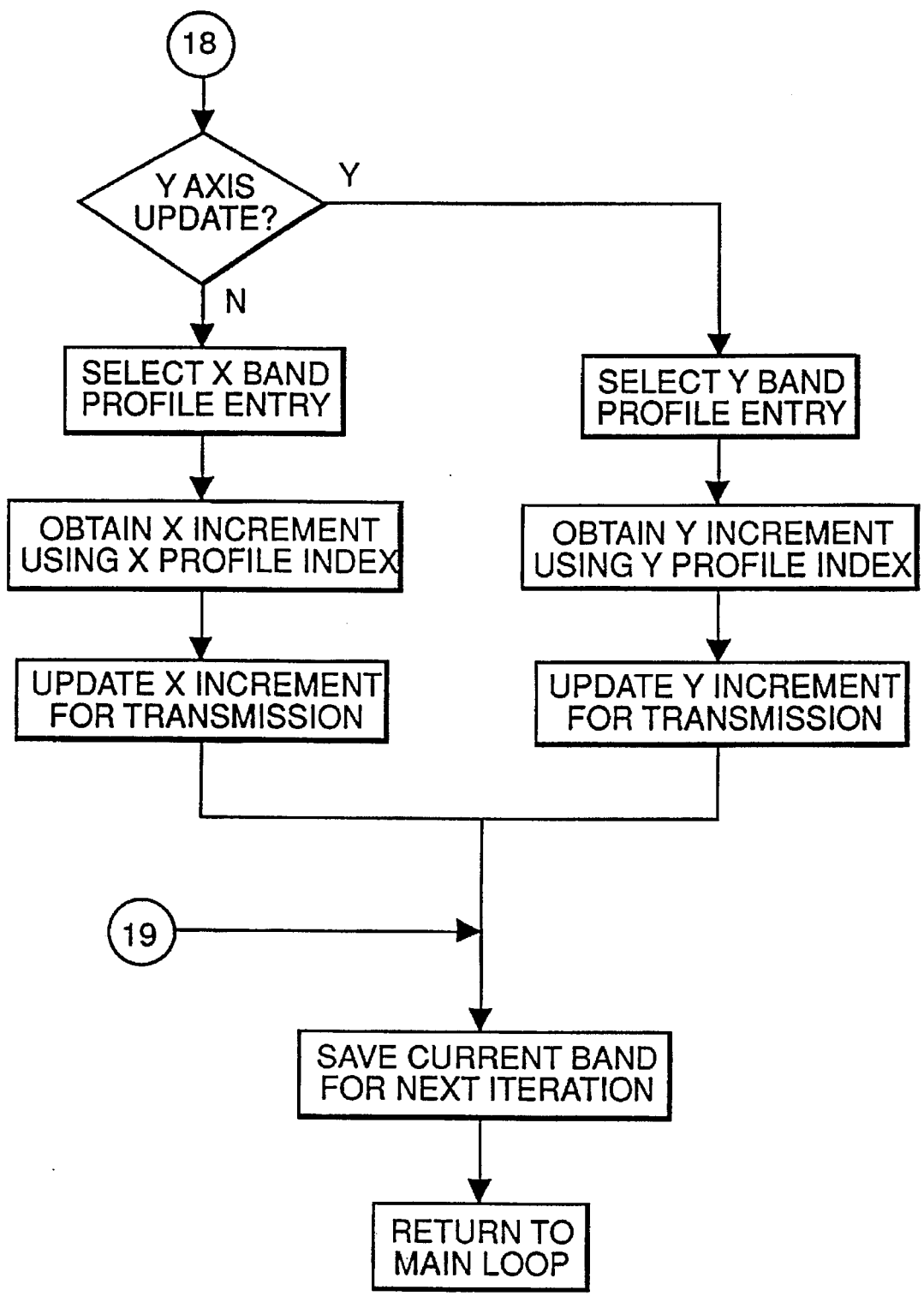

FIG. 21 shows an alternative construction of the transmitter housing. In this embodiment, case 105 includes a longer head portion 106 and a shorter handle portion 107 which make it more comfortable to hold in the hand for operation with a forefinger as shown in FIG. 22. This also seems to make it more convenient to use the transmitter when it is resting on a flat surface as shown in FIG. 23.

The microcontroller in the transmitter controls the content and transmission of data and protocol packets, the frequency and timing of control loop iterations, computation of position data during control loop execution and the logic used in such computations. Information is sent to the receiver which converts it to a form which can be utilized by the host computer. Position data is sampled at frequent intervals but data is sent to the receiver once in every two or three of the sampling intervals. This is based on an estimate of an interval which would satisfactorily capture the action of a user who is manipulating the position controller.

Figure 5:
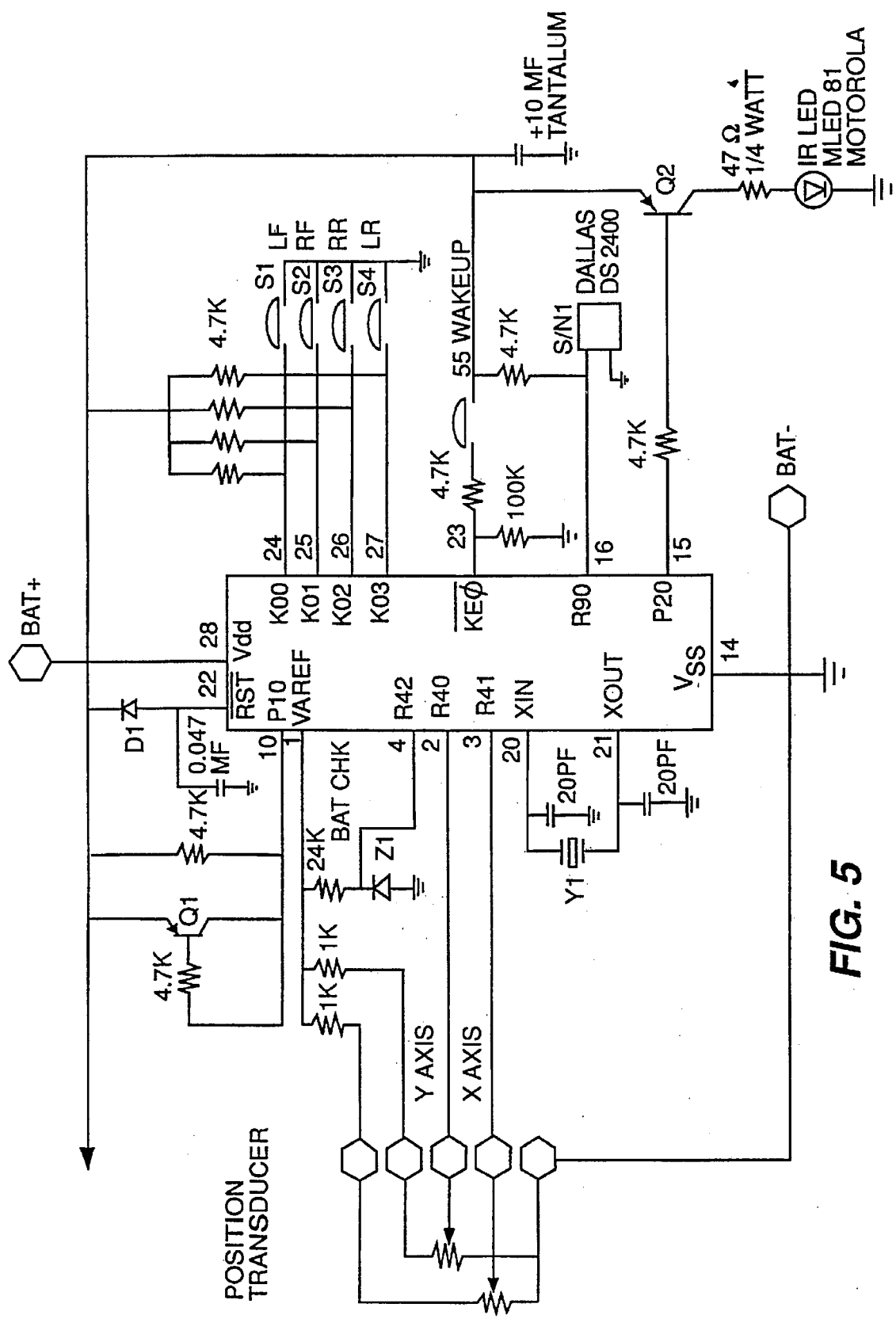
FIG. 5 is a schematic of one form of the transmitter of the invention.
Figure 6:
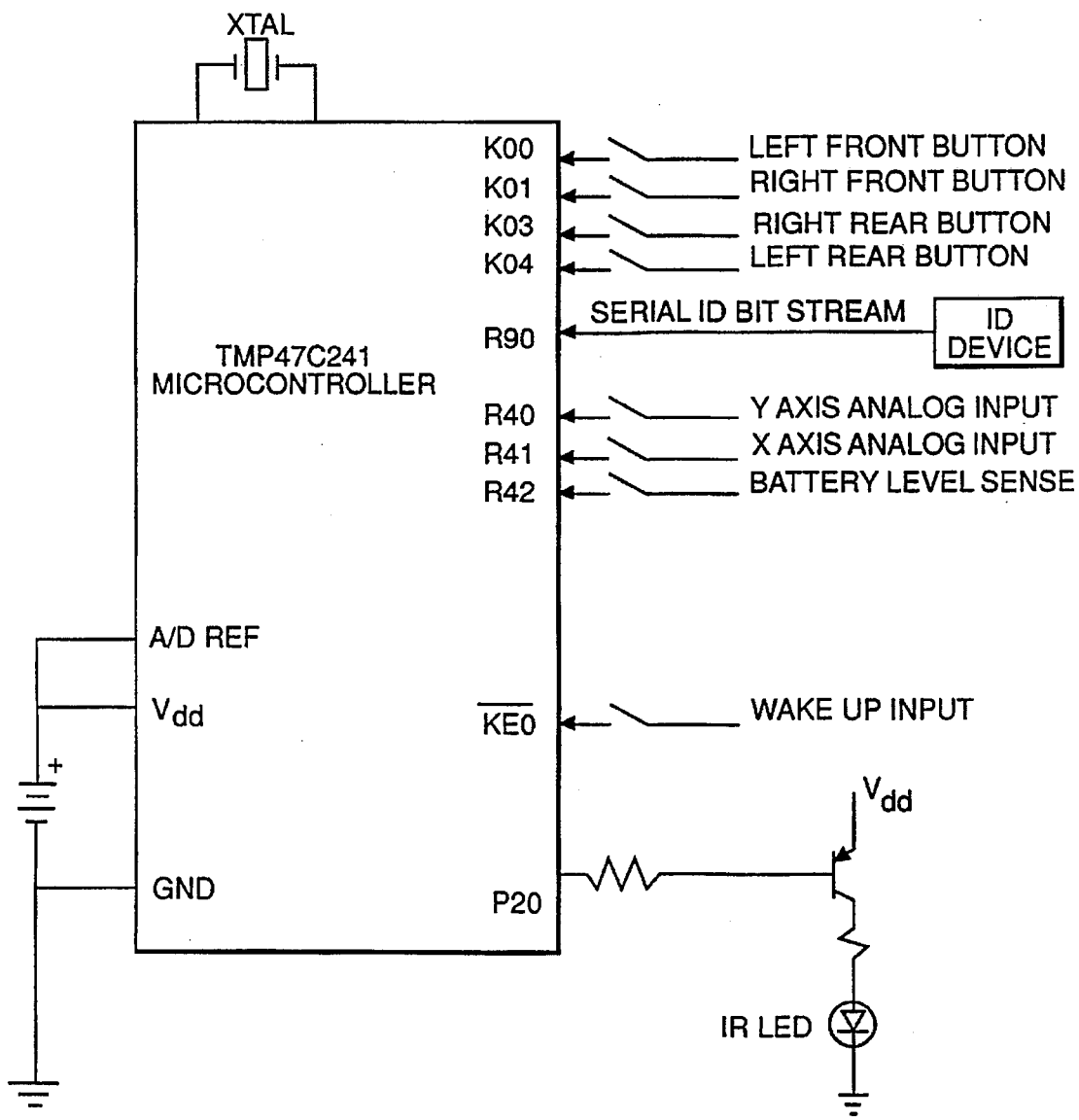
FIG. 6 is a block diagram of one form of the transmitter.
Figure 7:
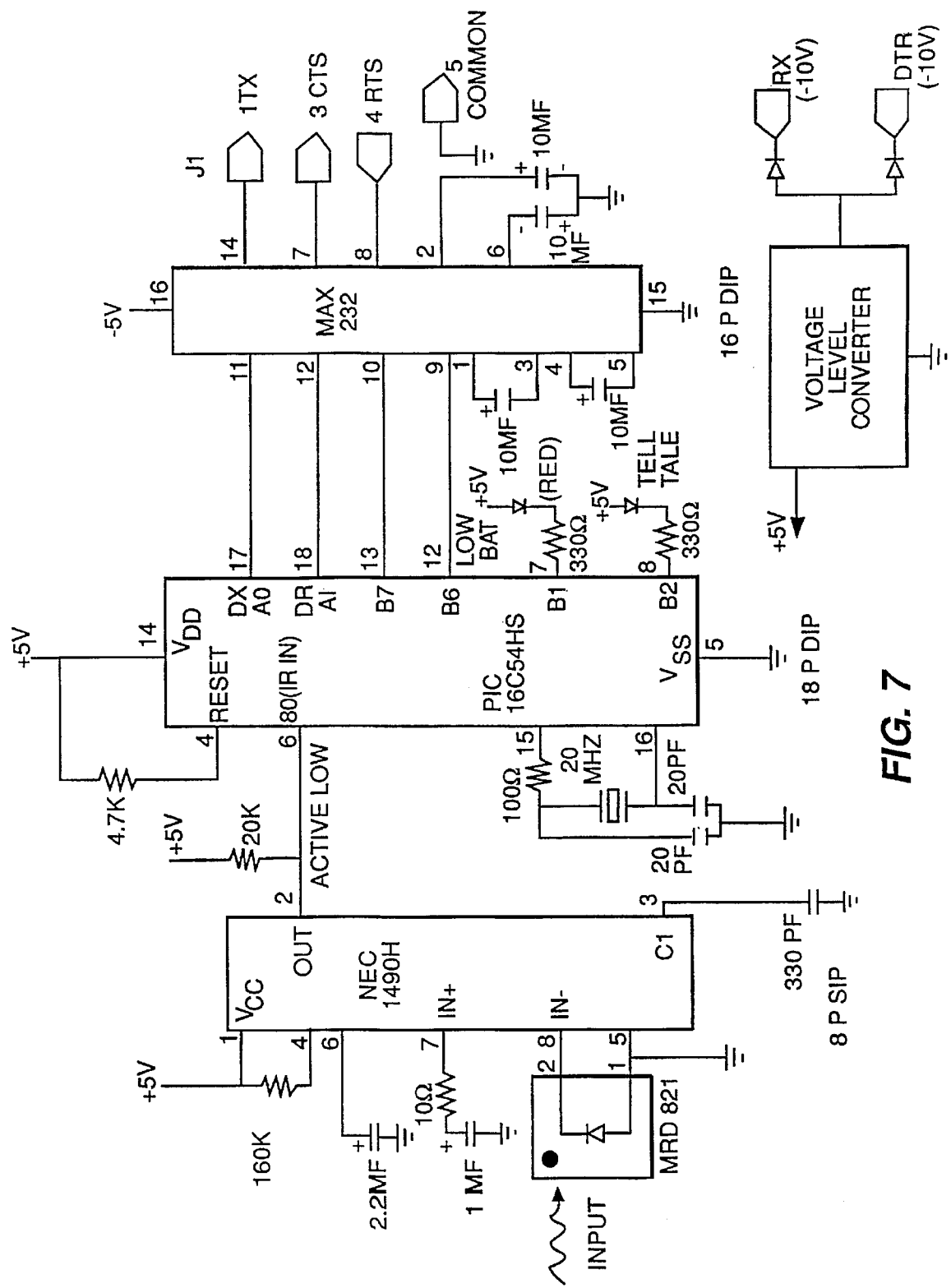
FIG. 7 is a schematic of one form of a receiver of the invention.
Figure 8:
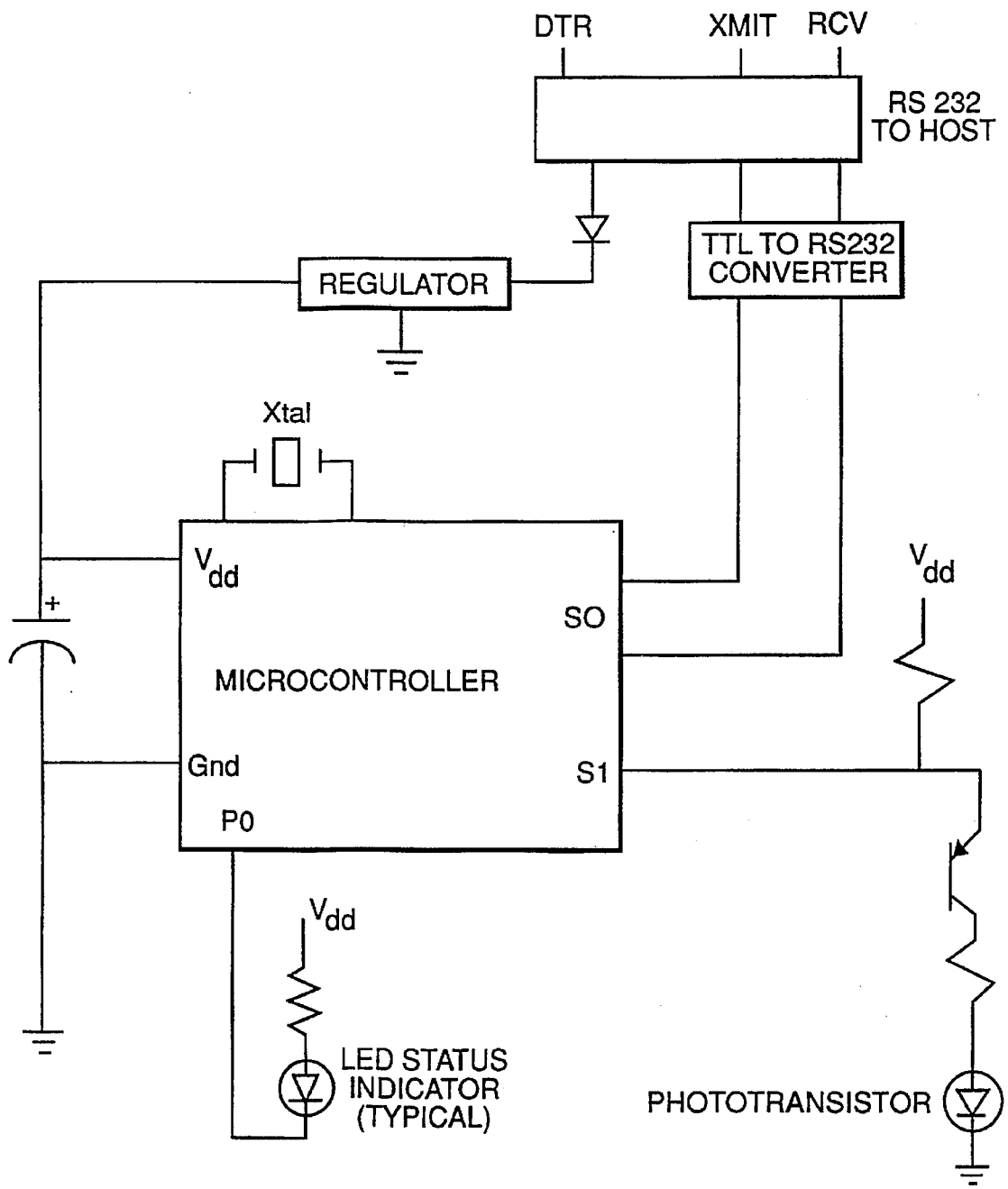
FIG. 8 is a block diagram of one form of the receiver.

Transmitter circuitry is shown in FIG. 5 and a block diagram of the transmitter circuit is shown in FIG. 6. The transmitter is normally in a low power consumption or dormant state and is activated when the initiation switch 20 is closed. The transmitter control software is configured so that closing switch 20 at any other time will not affect operation of the system. As long as the switch 20 is held closed the transmitter sends a special connect packet which includes the transmitter identifier as previously described. At intervals determined by the program, position data is obtained and sent to the receiver. In one embodiment, the iteration intervals may for example be on the order of 60 milliseconds and the transmittal intervals may for example be on the order of 120 or 180 milliseconds. In the second embodiment the iteration interval, which is constant in the first embodiment, is assigned one of two values (a "high value" and a "low value"), selected from the range of 30 milliseconds to 180 milliseconds, depending on the force applied to the transducer. We prefer to use a high value of 130 milliseconds when a large force is applied to the transducer and a low value of 50 milliseconds when a low force is applied to the transducer. In this second embodiment, position data is transmitted at each iteration. In both embodiments, position information is derived from a voltage taken from the potentiometers which is dependent on the force and position of pressure applied to the resistance element through disc 13 and which is read by analog to digital converters (A/D) attached to each resistance element and from a duration counter which is incremental on each iteration of the control loop during which the disc 13 has been held down.

When the disc 13 is pressed, the elastic pad 14 acts to distribute the force over a wider area. In particular, if force is not applied directly over one of the resistive elements, the pad 14 acts to distribute the force onto both elements. Furthermore, as additional force is applied the convex bottom of the disc 13 causes the disc to move in a rocking motion and the primary point of application of the force to move toward an outer edge 36 of resistance strips 16, 17. As the point of application moves, the transducer yields corresponding voltage changes. Voltage levels, which range from 0 to a maximum determined by circuit parameters, reflect the direction and magnitude of force applied to the disc. Voltages between 0 and a voltage somewhat below one-half of maximum represent movement in the negative direction of the corresponding axis. Voltages between a voltage somewhat greater than one-half of maximum and approximately the maximum represent movement in the positive direction of the corresponding axis. The band between the two ranges or neutral band assures that low-level noise inherent in the A/D converters does not result in the generation of spurious position data while the disc is in its neutral position.

The distances along the X and Y axes are divided into arbitrary units such as mickeys or pixels or other units. To obtain baseline position data or unit count, voltages outside the neutral band are divided into several bands which correspond to ranges of applied forces. Bands closer to the neutral band correspond to lower applied forces. Each band has an associated unit count; for computational efficiency counts for adjacent bands differ by factors of 2. If the current value from an A/D channel lies within the neutral band, the duration counter and the unit count are both reset to zero. A voltage level that does not lie within the neutral band determines the current baseline unit count. First, the value of the previous reading is checked. If the previous reading was within the neutral band, the current unit count is set to one, and the previous reading is updated with the current reading value. This logic assures that it is possible to generate a 1 unit position increment. If the previous reading was not within the neutral band, the current baseline unit count is set to correspond to the current reading. For example, ±8 units for the second band away from the neutral band. The current reading is then compared to the previous reading. If the previous reading equals the current reading, the baseline unit count is not changed. If the previous reading is less than the current reading, the unit count is halved. If the previous reading is greater than the current reading, the unit count is doubled. To accomplish unit count decrease the baseline unit count is shifted to the right and to accomplish unit count increase the baseline is shifted to the left.

After the unit count has been adjusted for voltage levels, if necessary it is then adjusted to reflect the length of time that force has been applied. Each time a voltage outside the neutral band is detected, a duration counter is incremented. When the duration counter crosses a first threshold value predetermined in the software, the baseline unit is doubled. When the duration count exceeds a second higher threshold value, the baseline unit count derived from the A/D value is no longer adjusted for duration count. This adjustment logic facilitates more rapid movements of the cursor across large screen areas in the middle of the screen, but prevents overshooting by slowing movement of the cursor as it presumably approaches the users desired target.

This adjustment logic attempts to account for the reaction time of a user and assumes that as the distance remaining to be traversed across the screen becomes shorter, the user will want to slow down movement of the cursor so he has greater control.

Control information sent by the transmitter also reflects the state of the momentary action switches located on the sides of the transmitter module. To provide maximum flexibility of operation by a user, four electrically independent switches are provided. Any one or combination of switches can be assigned to be the logical left mouse/trackball button, with the remaining switches assigned to be the logical right mouse/trackball button. Activating a switch causes a "button down" signal to be generated; releasing a switch causes a "button up" signal to be generated. If a button and the positioning knob are simultaneously pressed, both position data and button status data are transmitted to the computer, thus producing manipulation substantially like the familiar mouse "dragging" operation. The state of each switch is read upon every iteration of the main program control loop, after the A/D converters are read.

At the end of each control loop iteration, if either position data or button status data requires transmission to the host computer, a protocol packet is formed and sent. A protocol packet consists of a byte stream that begins with an ASCII standard SOH flag and terminates with a checksum byte. The second byte of a packet is a type byte which indicates the packet type and a sequence number. Potential packet types include but are not limited to a connect packet, a position packet, a voice communication packet and other data packets. Each packet type has a predefined fixed length. Therefore the type implicitly specifies the packet's total length. The sequence number is used for message synchronization. Every packet also contains a status byte and the two-byte identifying number of the transmitter unit. The status byte indicates the state of each button and whether or not the battery voltage is below either of two threshold voltages. Position packets contain an additional two bytes of relative position information. One byte indicates relative X coordinate changes since the last report; the second byte indicates Y coordinate changes since the last report.

Each time a protocol packet is formed, it is transmitted three times in a burst, then there is a random delay before a second burst is sent. The random time interval assures that two transmitter units do not become synchronized and continuously interfere with each other. Bursts of the same packet are periodically sent with increasing time intervals between each transmission until either new data are generated or a timeout period elapses, in which case the transmitter goes into its low power consumption state. The frequency and intervals between transmissions is determined by the software as is the duration of the timeout period during which no transmission occurs which will produce a shutdown of the transmitter.

As seen in FIG. 1, receiver 2 has a generally flat bottom surface which will rest stably on a table top or the like and an angular top surface, complementary to the bottom surfaces of the handle and head portions of transmitter 3. This permits the transmitter and receiver to be nested for compact storage or the transmitter maybe set on the receiver during operation when it is not desired to hand-hold the transmitter.

Receiver functions are executed by a microcontroller whose software is stored in ROM. The receiver detects Pulse Code Modulated Infrared (IR) data stream sent by the transmitter, verifies that the transmitter ID contained in the protocol pack is valid, decodes position and status information from the packet, and translates the resulting information into signals which can be directly applied to an interface port on the host computer. The logical connection between a transmitter and a receiver is established during an authentication process which involves pointing the transmitter at the receiver and generating a special "connect" packet by momentarily pressing the initiation or wake-up switch actuator 21 on the transmitter. The logical connection is maintained until the receiver is powered off or until another communication initialization packet is detected. Each time the receiver detects and validates an incoming IR data stream, an LED indicator 46 shown on the receiver circuit diagram controlled by the microcontroller is intermittently flashed. Also, if the incoming data stream indicates that transmitter batteries are low, a second LED indicator 47 shown on the receiver circuit diagram is turned on.

Although the invention has been shown and described in part as being a position control for a computer monitor cursor, it is obvious that the invention can be used for other purposes and in other contexts. For example, it may be used to control lights, sound or communication equipment or any other device having a variable and capable of producing a change therein in response to an electrical, infrared or electronic signal.

Although certain preferred embodiments have been shown and described, it should be understood that many changes and modifications may be made therein without departing from the scope of the appended claims.

We claim:

1. A method for remotely controlling a function of a computer monitor or other equipment in response to transmissions from less than all of a plurality of transmitters remote from said equipment, including the steps of;

(a) transmitting an identification number as a part of each transmission from each transmitter to the equipment, (b) comparing the identification number in each transmission received by the equipment with a previously designated identification number, (c) rejecting each transmission received by the equipment which does not contain said previously designated identification number, and (d) designating said previously designated identification number by transmitting a connect data packet from one of the plurality of transmitters to the equipment.

2. A system for operating a computer monitor or other equipment in response to transmissions generated by less than all of a plurality of transmitters remote from said equipment, comprising;

(a) means contained in each transmitter for transmitting an identification number as part of each transmission therefrom which is different from the identification numbers generated by all other transmitters of the said plurality of transmitters, (b) means contained in each transmitter for transmitting a connect packet, (c) means contained in the equipment for comparing the identification number in each transmission received by the equipment with the identification number received with the most recently received connect packet and rejecting each transmission which does not contain said identification number received with the most recently received connect packet.

3. A system as described in claim 2 further comprising means contained in each transmitter for storing the identification number thereof in random access memory.

4. A method for establishing a logical connection between a computer or other equipment and one of a plurality of transmitters remote from said equipment and for verifying subsequent transmissions from said one transmitter to said equipment, including the steps of;

(a) transmitting a connect data packet including an identification number from said one transmitter to the equipment, said identification number being different from any identification number of any other transmitter of said plurality of transmitters, and (b) rejecting subsequent transmissions received by the equipment which do not contain the identification number included in said connect packet.

5. A device for communicating to a computer or other equipment remote from said device, said device comprising;

(a) means for storing an identification number associated with said device, and (b) means for transmitting said identification number as part of each transmission from said device, said each transmission comprising a data packet comprising status data and the said identification number.

6. A device as described in claim 5 wherein the means for storing the identification number comprises means for storing the identification number in random access memory.

7. A device as described in claim 5 wherein the means for the device to communicate to the equipment comprises means for transmitting a pulse code modulated infrared data stream.

* * * * *

(12) EX PARTE REEXAMINATION CERTIFICATE (8781st)
United States Patent
Copper

(10) Number: US 5,640,152 C1
(45) Certificate Issued: Jan. 3, 2012

(54) HAND HELD COMPUTER INPUT APPARATUS AND METHOD

(75) Inventor: John M. Copper, Pittsburgh, PA (US)

(73) Assignee: Jack Copper, Pittsburgh, PA (US)

Reexamination Request:
No. 90/011,046, Jun. 15, 2010

Reexamination Certificate for:
Patent No.: 5,640,152
Issued: Jun. 17, 1997
Appl. No.: 08/585,923
Filed: Jan. 16, 1996

Related U.S. Application Data

(60) Division of application No. 08/238,355, filed on May 5, 1994, now Pat. No. 5,485,171, which is a division of application No. 07/864,466, filed on Apr. 6, 1992, now abandoned, which is a continuation-in-part of application No. 07/771,601, filed on Oct. 4, 1991, now abandoned.

(51) Int. Cl.
*H04Q 1/00* (2006.01)

(52) U.S. Cl. .................. 340/825.54; 340/825.69
(58) Field of Classification Search ................ None
See application file for complete search history.

(56) References Cited

To view the complete listing of prior art documents cited during the proceeding for Reexamination Control Number 90/011,046, please refer to the USPTO's public Patent Application Information Retrieval (PAIR) system under the Display References tab.

*Primary Examiner* — My Trang Nu Ton

(57) ABSTRACT

A method and system for generating command signals for a computer monitor or other equipment. The system includes at least one pressure responsive potentiometer and a device operatively connected with such potentiometer for generating a command signal indicating at least one of the direction, intensity and duration of pressure applied to such potentiometer. The method remotely controls a function of a computer monitor or other equipment in response to signals obtained from pressure sensitive potentiometers manipulated by a user. The method includes the steps of periodically iterating to detect signals present on such pressure sensitive potentiometers, comparing the signals detected on each iteration to determine at least one of the amount and direction of change, generating a control signal reflecting the information determined in the comparison step, then transmitting the control signal to the computer or other equipment in a form acceptable by such computer or other equipment to effect a change in the function being controlled. The control system includes a hand held device having a control disc readily manipulable by a digit of a hand holding the device. There is also disclosed a form of the hand held device in which position control signals as well as "clicking" and "dragging" operation signals can all be controlled with a single digit of the hand of a user.

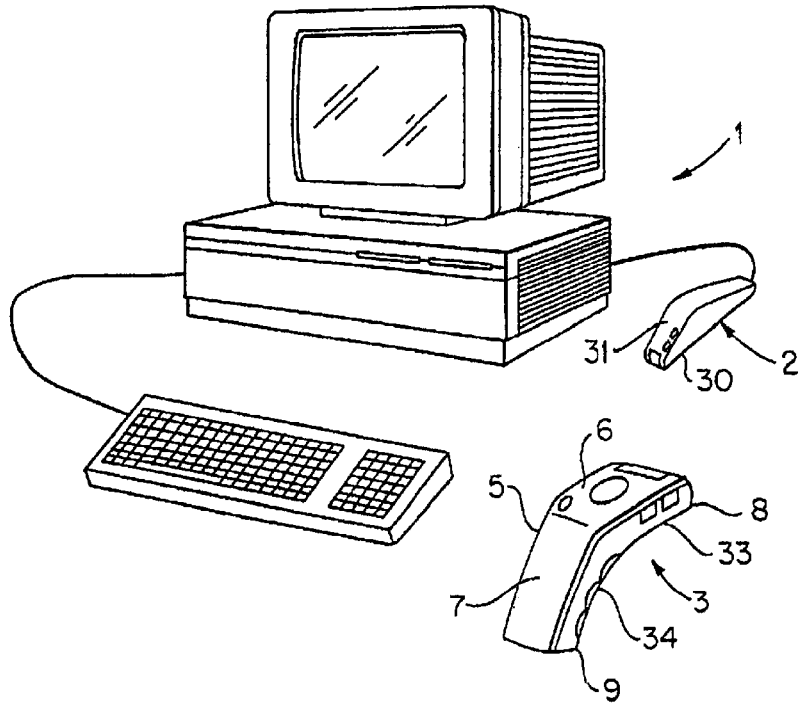

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-4 is confirmed.

Claims 5-7 are cancelled.

\* \* \* \* \*